United States Patent
Won et al.

(10) Patent No.: US 10,725,577 B2
(45) Date of Patent: Jul. 28, 2020

(54) DISPLAY DEVICE FOR A VEHICLE AND VEHICLE CONTROL SYSTEM INCLUDING THE SAME

(71) Applicant: SAMSUNG DISPLAY CO., LTD., Yongin-si, Gyeonggi-Do (KR)

(72) Inventors: Byeong Hee Won, Yongin-si (KR); Ki Seo Kim, Yongin-si (KR); Won Sang Park, Yongin-si (KR); Seung Lyong Bok, Yongin-si (KR)

(73) Assignee: SAMSUNG DISPLAY CO., LTD., Yongin-si, Gyeonggi-Do (KR)

(*) Notice: Subject to any disclaimer, the term of this patent is extended or adjusted under 35 U.S.C. 154(b) by 111 days.

(21) Appl. No.: 15/843,929

(22) Filed: Dec. 15, 2017

(65) Prior Publication Data
US 2018/0210604 A1    Jul. 26, 2018

(30) Foreign Application Priority Data
Jan. 25, 2017 (KR) .................. 10-2017-0012147

(51) Int. Cl.
*B60R 25/00* (2013.01)
*G06F 3/00* (2006.01)
(Continued)

(52) U.S. Cl.
CPC ............ *G06F 3/0416* (2013.01); *B60K 37/06* (2013.01); *G06F 3/016* (2013.01); *G06F 3/044* (2013.01);
(Continued)

(58) Field of Classification Search
CPC ........ G06F 3/011; G06F 3/016; G06F 3/0412; G06F 3/0416; G06F 3/044; G06F 3/0481;
(Continued)

(56) References Cited

U.S. PATENT DOCUMENTS 6,271,745 B1 * 8/2001 Anzai ................ G07C 9/00158
340/5.23
6,526,335 B1 * 2/2003 Treyz .................... G01C 21/26
307/10.1

(Continued)

FOREIGN PATENT DOCUMENTS

| KR | 10-1585201    | 1/2016 |
| KR | 10-2016-0026300 | 3/2016 |
| KR | 10-1615489    | 4/2016 |

*Primary Examiner* — Michael J Eurice
(74) *Attorney, Agent, or Firm* — F. Chau & Associates, LLC

(57) ABSTRACT

A display device for a vehicle may include a display panel configured to display an image and a touch sensor configured to sense a touch of a user and generate touch information about the touch. The touch sensor may be operated in a first mode or a second mode. The touch information may include first information about a fingerprint of the user, second information about a position of the touch, and third information about movement of the touch. When the touch of the user is sensed, the touch sensor may operate in the first mode and generate the first information. When the generation of the first information is completed, the touch sensor may operate in the second mode and generate the second information and the third information. The power and the ignition of the vehicle may be controlled using the touch information.

19 Claims, 14 Drawing Sheets

(51) Int. Cl.
*G06F 3/041* (2006.01)
*G06F 3/044* (2006.01)
*B60K 37/06* (2006.01)
*G06F 3/01* (2006.01)
*G06K 9/00* (2006.01)
*G06F 3/0481* (2013.01)
*G06F 3/0488* (2013.01)
*G06F 21/32* (2013.01)
*G06F 21/31* (2013.01)
*G06F 21/46* (2013.01)
*B60R 25/25* (2013.01)

(52) U.S. Cl.
CPC ........ *G06F 3/0481* (2013.01); *G06F 3/04883* (2013.01); *G06K 9/0002* (2013.01); *B60K 2370/146* (2019.05); *B60K 2370/1438* (2019.05); *B60K 2370/1468* (2019.05); *B60R 25/25* (2013.01); *B60R 25/252* (2013.01); *G06F 3/011* (2013.01); *G06F 3/0412* (2013.01); *G06F 3/04886* (2013.01); *G06F 21/31* (2013.01); *G06F 21/32* (2013.01); *G06F 21/46* (2013.01)

(58) Field of Classification Search
CPC .. G06F 3/04883; G06F 3/04886; G06F 21/31; G06F 21/32; G06F 21/46; G06K 9/0002; B60K 37/06; B60K 2370/1438; B60K 2370/146; B60K 2370/1468; B60R 25/25; B60R 25/252
See application file for complete search history.

(56) References Cited

U.S. PATENT DOCUMENTS

| | | | |
|---|---|---|---|
| 8,782,775 B2 | 7/2014 | Fadell et al. | |
| 9,221,409 B1* | 12/2015 | Gauthier | B60R 16/03 |
| 10,279,779 B1* | 5/2019 | Lee | G06F 21/32 |
| 2002/0017984 A1* | 2/2002 | Kawai | B60R 25/2081 340/426.1 |
| 2002/0048391 A1* | 4/2002 | Kim | B60R 25/04 382/124 |
| 2002/0128769 A1* | 9/2002 | Der Ghazarian | G07B 15/04 701/408 |
| 2002/0130769 A1* | 9/2002 | Yamagishi | B60R 25/1004 340/426.13 |
| 2006/0041590 A1* | 2/2006 | King | H04N 1/00244 |
| 2006/0049922 A1* | 3/2006 | Kolpasky | B60R 25/257 340/426.13 |
| 2006/0129930 A1* | 6/2006 | Katoh | G09G 5/363 715/700 |
| 2006/0131400 A1* | 6/2006 | Mitsumoto | G06K 17/0022 235/382 |
| 2006/0170286 A1* | 8/2006 | Voda | B60R 25/04 307/10.1 |
| 2006/0273886 A1* | 12/2006 | Yamamoto | G07C 9/00309 340/426.36 |
| 2007/0110287 A1* | 5/2007 | Kim | G06F 3/03547 382/124 |
| 2007/0115205 A1* | 5/2007 | Uchiyama | G02B 26/0816 345/7 |
| 2008/0030301 A1* | 2/2008 | Terao | B60R 25/04 340/5.53 |
| 2009/0083847 A1* | 3/2009 | Fadell | G06F 21/316 726/16 |
| 2009/0189373 A1* | 7/2009 | Schramm | B60K 35/00 280/731 |
| 2009/0309180 A1* | 12/2009 | Yamagata | G06K 9/0002 257/435 |
| 2011/0070827 A1* | 3/2011 | Griffin | H04B 5/02 455/41.1 |
| 2011/0213700 A1* | 9/2011 | Sant'anselmo | G06Q 10/10 705/39 |
| 2011/0215484 A1* | 9/2011 | Bond | G06K 9/0002 257/787 |
| 2012/0214472 A1* | 8/2012 | Tadayon | H04B 5/0062 455/418 |
| 2012/0253552 A1* | 10/2012 | Skelton | B60K 28/063 701/2 |
| 2012/0268423 A1* | 10/2012 | Hotelling | G06F 3/0412 345/174 |
| 2012/0286928 A1* | 11/2012 | Mullen | G06Q 10/00 340/5.61 |
| 2013/0106603 A1* | 5/2013 | Weast | G06F 1/163 340/539.11 |
| 2013/0151111 A1* | 6/2013 | Skelton | B60R 25/00 701/99 |
| 2014/0053189 A1* | 2/2014 | Lee | H04N 21/4858 725/37 |
| 2014/0058941 A1* | 2/2014 | Moon | G06Q 20/322 705/42 |
| 2014/0085460 A1* | 3/2014 | Park | G06F 21/84 348/135 |
| 2014/0140588 A1* | 5/2014 | Chou | G06K 9/0002 382/124 |
| 2014/0225749 A1* | 8/2014 | Saka | G08G 1/096855 340/905 |
| 2014/0309806 A1* | 10/2014 | Ricci | B60Q 1/00 701/1 |
| 2014/0309870 A1* | 10/2014 | Ricci | H04W 4/21 701/36 |
| 2014/0333328 A1* | 11/2014 | Nelson | G06F 3/044 324/663 |
| 2014/0341448 A1* | 11/2014 | Chiu | G06K 9/0002 382/124 |
| 2015/0030217 A1* | 1/2015 | Wickboldt | G06K 9/00026 382/124 |
| 2015/0066238 A1* | 3/2015 | Todd | B60K 28/063 701/1 |
| 2015/0086090 A1* | 3/2015 | Jung | G06K 9/00013 382/124 |
| 2015/0103018 A1* | 4/2015 | Kamin-Lyndgaard | G09G 5/006 345/173 |
| 2015/0177884 A1* | 6/2015 | Han | G06F 3/044 345/174 |
| 2015/0197205 A1* | 7/2015 | Xiong | B60R 16/037 701/49 |
| 2015/0242033 A1* | 8/2015 | Ham | G06F 3/0412 345/174 |
| 2015/0294516 A1* | 10/2015 | Chiang | G07C 9/00158 340/5.83 |
| 2015/0310248 A1* | 10/2015 | Riedijk | G06K 9/0002 382/124 |
| 2015/0324569 A1* | 11/2015 | Hong | G06F 21/32 345/174 |
| 2016/0063295 A1 | 3/2016 | Kim et al. | |
| 2016/0364036 A1* | 12/2016 | Deng | A61B 5/02438 |
| 2017/0104865 A1* | 4/2017 | Skelton | H04M 1/72569 |
| 2017/0308228 A1* | 10/2017 | Benkley, III | G06K 9/00013 |
| 2019/0042017 A1* | 2/2019 | Lu | G06F 3/044 |
| 2019/0051711 A1* | 2/2019 | Lee | G09G 3/3208 |

* cited by examiner

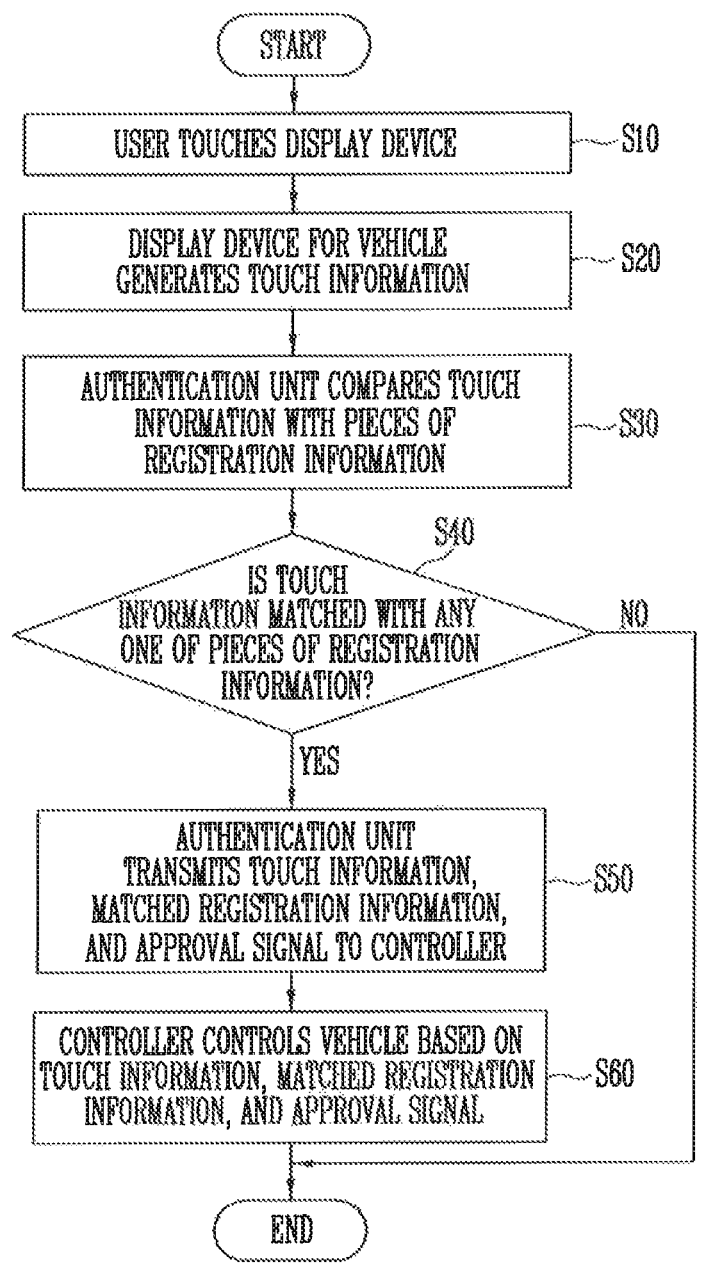

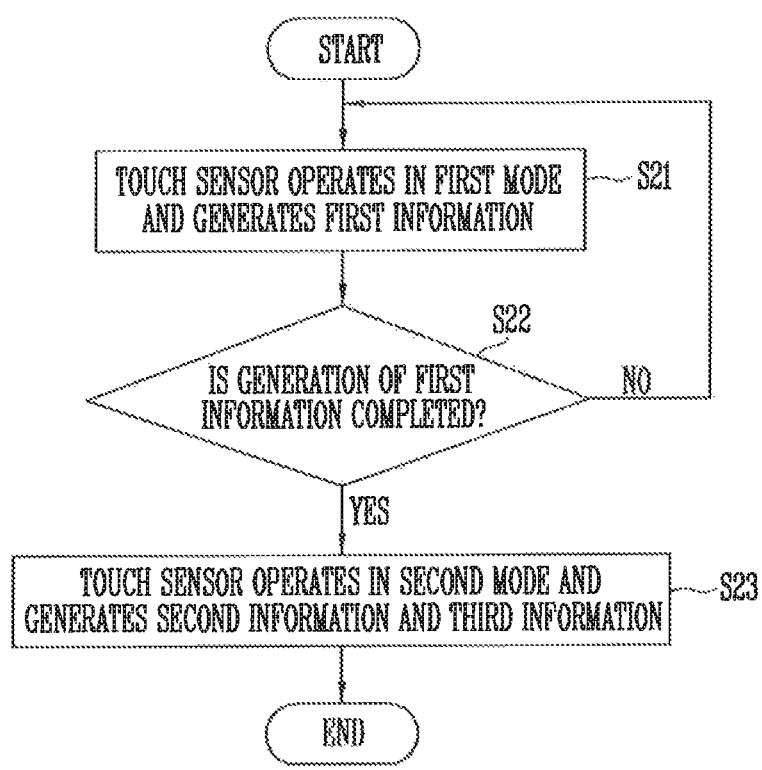

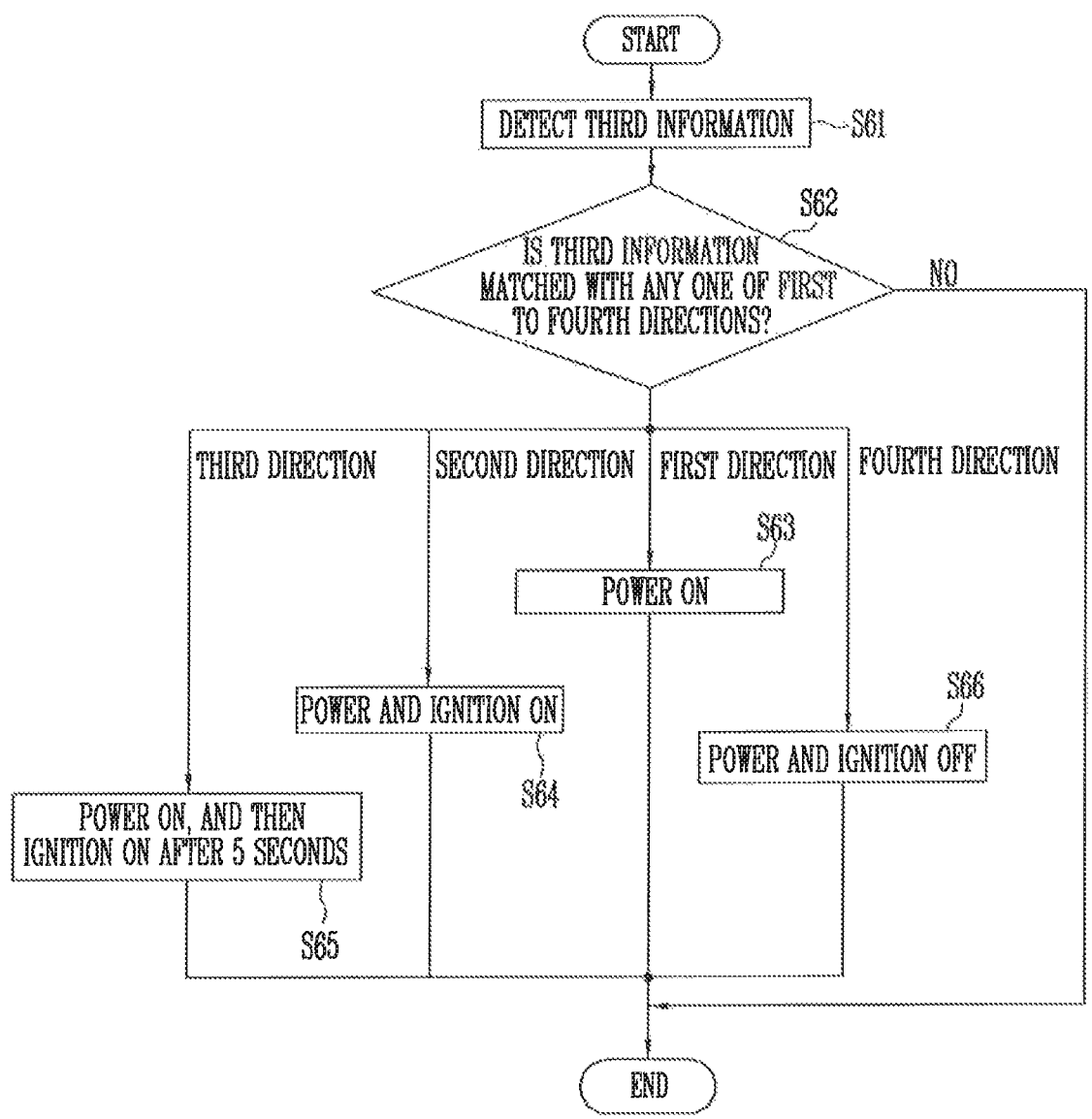

DISPLAY DEVICE FOR A VEHICLE AND VEHICLE CONTROL SYSTEM INCLUDING THE SAME

CROSS-REFERENCE TO RELATED APPLICATION

The present application claims priority under 35 U.S.C. § 119 to Korean patent application number 10-2017-0012147, filed on Jan. 25, 2017, the entire disclosure of which is incorporated by reference herein in its entirety.

TECHNICAL FIELD

Exemplary embodiments of the inventive concept relate to a display device for a vehicle and a vehicle control system including the same.

DISCUSSION OF RELATED ART

Hitherto key entry systems for vehicles using a remote controller or a security card have been implemented to protect the vehicles from theft.

When using a remote controller, a user may manipulate the remote controller to control the locking or unlocking of a door of a vehicle.

When using a security card, if the user who has the security card approaches the vehicle, the locking or unlocking of a door thereof is controlled. If the user enters the vehicle, an ID of the security card is checked to authenticate the user.

However, for systems using the remote controller or the security card, the user has to carry the remote controller or the security card, and if the user loses the remote controller or the security card, there is an increased likelihood of the vehicle being stolen by other persons.

Thus, a fingerprint identification system may instead be used that can identify the fingerprint of the user to authenticate the user.

SUMMARY

According to an exemplary embodiment of the inventive concept, a display device for a vehicle includes a display panel configured to display an image and a touch sensor disposed on the display panel and configured to sense a touch of a user and generate touch information about the touch. The touch sensor may be operated in a first mode or a second mode. The first mode may be a mode in which the touch sensor operates at a first resolution, and the second mode may be a mode in which the touch sensor operates at a second resolution lower than the first resolution. The touch information may include first information about a fingerprint of the user, second information about a position of the touch, and third information about movement of the touch. When the touch of the user is sensed, the touch sensor may operate in the first mode and generate the first information. When the generation of the first information is completed, the touch sensor may operate in the second mode and generate the second information and the third information. Power and ignition of the vehicle may be controlled using the touch information.

In an exemplary embodiment of the inventive concept, the display device may be a start button of the vehicle.

In an exemplary embodiment of the inventive concept, the display device may be disposed in a center fascia of the vehicle.

In an exemplary embodiment of the inventive concept, the touch sensor may include a plurality of sensor pixels configured to sense a change in capacitance corresponding to the touch and sensor scan lines and output lines coupled to the plurality of sensor pixels. Among the plurality of sensor pixels, a first sensor pixel is coupled with an i-th sensor scan line and a j-th output line, where i is an integer greater than or equal to 2 and j is a natural number. The first sensor pixel may include a sensor electrode, a first transistor including a gate electrode coupled to the sensor electrode, the first transistor being configured to control current output through the j-th output line, a second transistor including a gate electrode coupled to the i-th sensor scan line, the second transistor being coupled between a reference voltage line and the first transistor, and a capacitor electrode configured to form a first capacitor with the sensor electrode, and coupled to the i-th sensor scan line.

In an exemplary embodiment of the inventive concept, the first sensor pixel may further include a third transistor including a gate electrode coupled to an i−1-th scan line, the third transistor being coupled between the reference voltage line and the sensor electrode.

In an exemplary embodiment of the inventive concept, the sensor electrode may form a second capacitor in response to the touch. The touch sensor may generate the touch information using a change in capacitance of the second capacitor corresponding to the touch.

In an exemplary embodiment of the inventive concept, the display device may further include a pressure sensor configured to generate pressure information about a change in pressure of the touch of the user. The touch information may further include the pressure information.

In an exemplary embodiment of the inventive concept, the display device may further include a haptic module configured to generate a haptic effect to be felt by the user, using the touch information.

In an exemplary embodiment of the inventive concept, the display panel may display the image in an always-on-display manner.

In an exemplary embodiment of the inventive concept, the touch information may further include fourth information about lines of knuckles of a finger or lines of a palm of the user.

According to an exemplary embodiment of the inventive concept, a vehicle control system includes a display device for a vehicle, an authentication unit configured to authenticate a user of the vehicle using touch information, and a controller configured to control the vehicle using the touch information and a result of the authentication by the authentication unit. The display device may include a display panel configured to display an image and a touch sensor disposed on the display panel and configured to sense a touch of the user and generate the touch information about the touch. The touch sensor may include a plurality of sensor pixels configured to sense a change in capacitance corresponding to the touch. The touch sensor may be operated in a first mode or a second mode. The first mode may be a mode in which the touch sensor operates at a first resolution, and the second mode may be a mode in which the touch sensor operates at a second resolution lower than the first resolution.

In an exemplary embodiment of the inventive concept, the touch information may include first information about a fingerprint of the user, second information about a position of the touch, and third information about movement of the touch.

In an exemplary embodiment of the inventive concept, the touch information may further include fourth information about lines of knuckles of a finger or lines of a palm of the user.

In an exemplary embodiment of the inventive concept, when the touch of the user is sensed, the touch sensor may operate in the first mode and generate the first information. When the generation of the first information is completed, the touch sensor may operate in the second mode and generate the second information and the third information.

In an exemplary embodiment of the inventive concept, the authentication unit may include an authentication processing unit configured to compare the touch information with a plurality of pieces of registration information, and transmit the touch information, matched registration information, and an approval signal to the controller when the touch information is matched with any one of the plurality of pieces of registration information, a user information storage unit configured to store the plurality of pieces of registration information, and a temporary information storage unit configured to store the touch information.

In an exemplary embodiment of the inventive concept, when the approval signal is received, the controller may detect the third information included in the touch information.

In an exemplary embodiment of the inventive concept, when the third information is matched with a first direction, the controller may control the vehicle such that power of the vehicle is turned on. When the third information is matched with a second direction, the controller may control the vehicle such that the power and the ignition of the vehicle are turned on. When the third information is matched with a third direction, the controller may control the vehicle such that the power of the vehicle is turned on and, after a predetermined time has passed to preheat the vehicle, the ignition of the vehicle is turned on. When the third information is matched with a fourth direction, the controller may control the vehicle such that the power and the ignition of the vehicle are turned off.

In an exemplary embodiment of the inventive concept, when the approval signal is received, the controller may control the vehicle such that a steering wheel and a gearshift lever thereof are unlocked.

In an exemplary embodiment of the inventive concept, when the approval signal is received, the controller may provide a preset user interface to the user using the matched registration information. The preset user interface may include at least one of a position of a steering wheel, orientation of a rear-view mirror and a side mirror, a position and an angle of a driver seat, an audio channel, or an air conditioning temperature.

In an exemplary embodiment of the inventive concept, the controller may include a memory configured to store the image. When the approval signal is received, the controller may control the vehicle such that the display panel displays the image using the touch information.

According to an exemplary embodiment of the inventive concept, a method of operating a vehicle control system including a display device, an authentication unit, and a controller includes sensing, by the display device, a touch of a user, generating, by the display device, first information about a fingerprint of the user, determining whether generation of the first information is completed, generating, by the display device, second information about a position of the touch and third information about movement of the touch when it is determined that generation of the first information is completed, transmitting touch information including the first information, the second information, and the third information from the display device to the authentication unit, authenticating, by the authentication unit, the user using the touch information, and controlling, by the controller, at least one of power or ignition of a vehicle using the touch information when the user is authenticated.

BRIEF DESCRIPTION OF THE DRAWINGS

The above and other features of the inventive concept will become more apparent by describing in detail exemplary embodiments thereof with reference to the accompanying drawings.

FIG. 11 is a flowchart illustrating a method of operating the vehicle control system of FIG. 10 in accordance with an exemplary embodiment of the inventive concept.

FIG. 12 is a flowchart illustrating in detail an operation in which a touch sensor generates touch information in FIG. 11 in accordance with an exemplary embodiment of the inventive concept.

FIG. 14 is a flowchart illustrating in detail an operation in which a controller shown in FIG. 11 controls the vehicle in accordance with an exemplary embodiment of the inventive concept.

DETAILED DESCRIPTION OF THE EMBODIMENTS

Figure 1A:
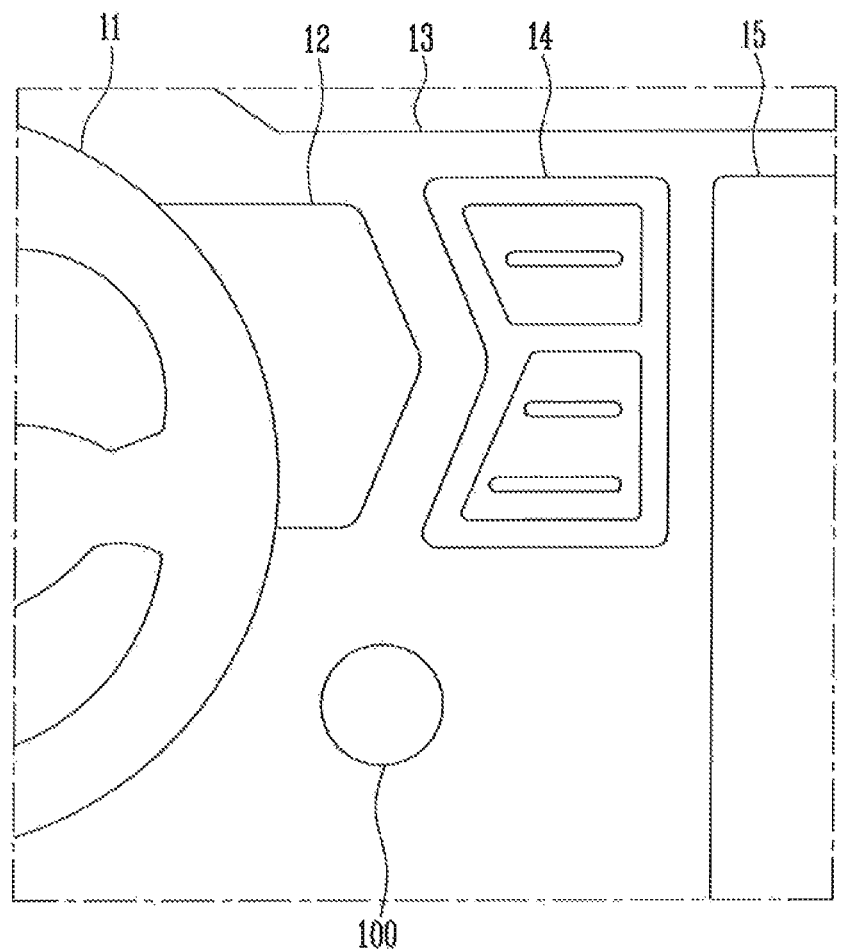
FIG. 1A is a diagram illustrating a portion of an internal structure of a vehicle including a display device in accordance with an exemplary embodiment of the inventive concept.

Exemplary embodiments of the inventive concept are directed to a display device for a vehicle and a vehicle control system including the same, which is capable of performing an authentication process at the moment that a user touches the display device for the vehicle, and which has increased security performance and provides an optimized user interface to different users.

Exemplary embodiments of the inventive concept will be described more fully hereinafter with reference to the accompanying drawings. Details that are not related to description of the inventive concept will be omitted for clarity of description. Like reference numerals may refer to like elements through this application.

It will be understood that, although the terms "first", "second", etc. may be used herein to describe various components, these components should not be limited by these terms. These terms are only used to distinguish one component from other components.

In addition, it will be understood that the terms "comprises" "comprising", "includes", and/or "including" when used herein, specify the presence of stated features, integers, operations, operations, elements, and/or components, but do not preclude the presence or addition of one or more other features, integers, operations, operations, elements, components, and/or groups thereof.

In the drawings, dimensions may be exaggerated for clarity of illustration. It will be understood that when an element is referred to as being "between" two elements, it can be the only element between the two elements, or one or more intervening elements may also be present. The drawings are not necessarily to scale and in some instances, proportions may have been exaggerated to clearly illustrate features of the exemplary embodiments of the inventive concept.

FIG. 1A is a diagram illustrating a portion of an internal structure of a vehicle including a display device in accordance with an exemplary embodiment of the inventive concept. Referring to FIG. 1A, the vehicle may include, in a passenger compartment thereof, a display device 100 for vehicles, a steering wheel 11, an instrument panel 12, a dashboard 13, a vent 14, and a center fascia 15.

The steering wheel 11, the instrument panel 12, the dashboard 13, the vent 14, and the center fascia 15 shown in FIG. 1A are general components provided in a passenger compartment of a typical vehicle; therefore, detailed description thereof will be omitted.

Referring to FIG. 1A, the display device 100 for the vehicle may be disposed below the instrument panel 12.

The power or ignition of the vehicle may be controlled when the hand of the user touches the display device 100.

In an exemplary embodiment of the inventive concept, the display device 100 may be embodied as a start button for controlling the power and the ignition of the vehicle, but the inventive concept is not limited thereto.

Figure 1B:
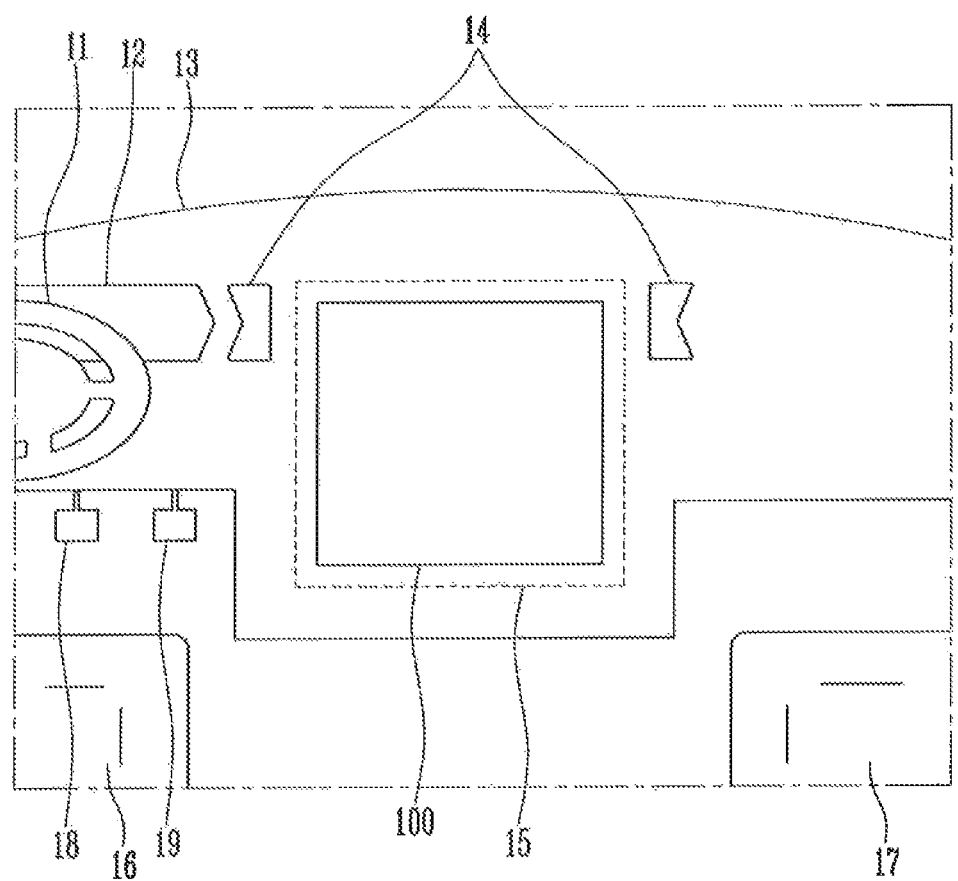
FIG. 1B is a diagram illustrating a portion of an internal structure of a vehicle including a display device in accordance with an exemplary embodiment of the inventive concept.

FIG. 1B is a diagram illustrating a portion of an internal structure of a vehicle including a display device in accordance with an exemplary embodiment of the inventive concept. The internal structure of the vehicle shown in FIG. 1B corresponds to that of the vehicle including the display device 100 shown in FIG. 1A; therefore, the same reference numerals are used to designate like elements, and detailed descriptions pertaining thereto will be omitted if deemed redundant.

Referring to FIG. 1B, the vehicle may include, in a passenger compartment thereof, the display device 100 for vehicles, the steering wheel 11, the instrument panel 12, the dashboard 13, the vent 14, the center fascia 15, a driver seat 16, a passenger seat 17, a brake pedal 18, and an accelerator pedal 19.

Referring to FIG. 1B, the display device 100 for the vehicle may be disposed between the driver seat 16 and the passenger seat 17. As described above, the power or the ignition of the vehicle may be controlled when the hand of the user touches the display device 100. In an exemplary embodiment of the inventive concept, the display device 100 may be a large display device which is disposed or embedded in the center fascia 15 of the vehicle, but the inventive concept is not limited thereto.

In an exemplary embodiment of the inventive concept, the display device 100 shown in FIGS. 1A and 1B may be flexible. The term "flexible" refers to the bendability of an object; in other words, the object can be deformed to a certain extent without being damaged.

Figure 2A:
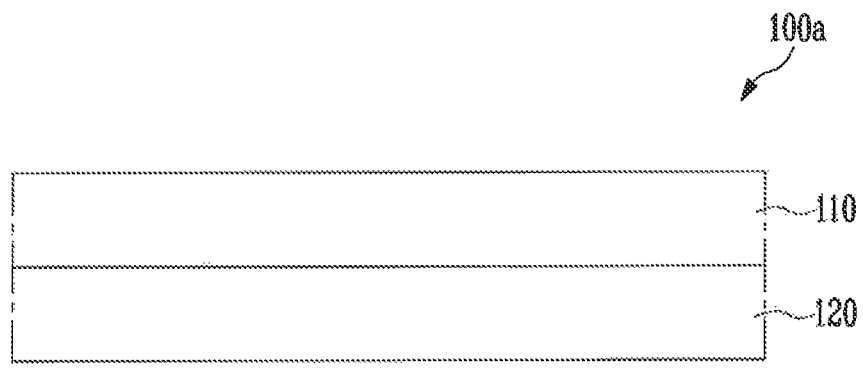
FIGS. 2A and 2B are diagrams illustrating the structure of a display device for a vehicle in accordance with exemplary embodiments of the inventive concept.
Figure 2B:
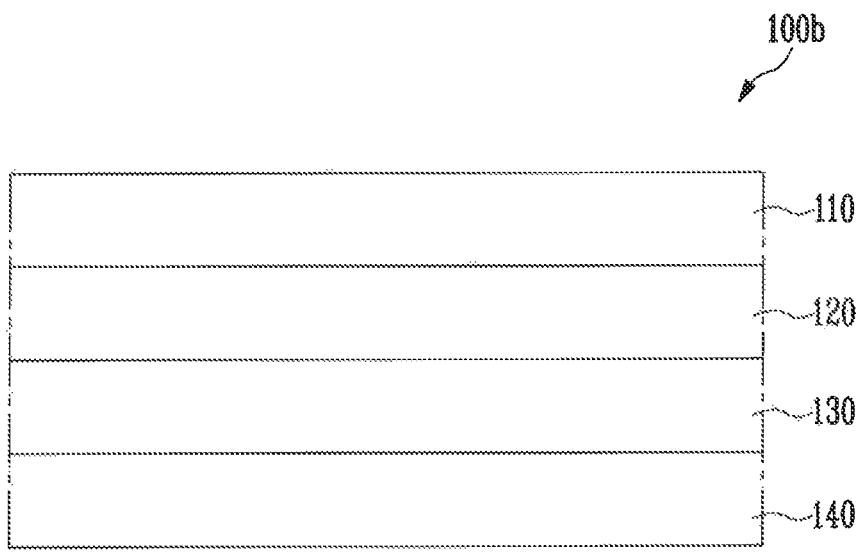

FIGS. 2A and 2B are diagrams illustrating the structure of a display device for a vehicle in accordance with exemplary embodiments of the inventive concept.

In FIG. 2A, a display device 100a for a vehicle in accordance with an exemplary embodiment of the inventive concept may include a touch sensor 110 and a display panel 120.

In FIG. 2A, the touch sensor 110 and the display panel 120 are successively stacked, but the inventive concept is not limited thereto. For example, the sequence in which the touch sensor 110 and the display panel 120 are stacked may be modified in various ways.

The touch sensor 110 may sense a touch generated by the user. For example, the touch may be generated by a finger, a palm, or the like which is a part of the user's body. A target to be sensed by the touch sensor 110 may include any one of a fingerprint, a position of the touch, movement of the touch, the lines of the knuckles of the finger, or the lines of the palm.

The fingerprint, the lines of the knuckles of the finger, or the lines of the palm of the user may include valleys and ridges. Details pertaining to this will be explained later herein with reference to FIGS. 6A and 6B.

The touch sensor 110 may generate touch information about the touch generated by the user. For example, the touch information may include at least one of first information about the fingerprint of the user, second information about the position of the touch, and third information about the movement of the touch. The touch information may further include fourth information about the lines of the knuckles of the finger or the lines of the palm of the user.

In an exemplary embodiment of the inventive concept, the touch sensor 110 may be operated in one of a first mode or a second mode. The first mode may be a mode in which the touch sensor 110 operates at a first resolution. The second mode may be a mode in which the touch sensor 110 operates at a second resolution lower than the first resolution.

For example, the first resolution may range from 450 ppi (pixel per inch) to 5000 ppi. The second resolution may range from 200 ppi to 400 ppi. However, the inventive concept is not limited thereto. The first resolution may be set to a level with which the touch sensor 110 can recognize the fingerprint of the user. The second resolution may be set to a level with which the touch sensor 110 can recognize a touch of the user.

Details of the touch sensor 110 will be described later herein with reference to FIGS. 3 to 8.

The display panel 120 may display an image corresponding to input image data. In an exemplary embodiment of the inventive concept, the display panel 120 may be a liquid crystal display (LCD) panel, an organic light emitting display (OLED) panel, an electrophoretic display panel, or an electro wetting display panel. The kind of the display panel 120 is not limited to any particular kind of display panel.

The display panel 120 may be flexible. The display panel 120 may be a panel having characteristic flexibility such that it may be bent by external force in substantially the same manner as a plastic panel or a thin metal panel.

Figure 10:
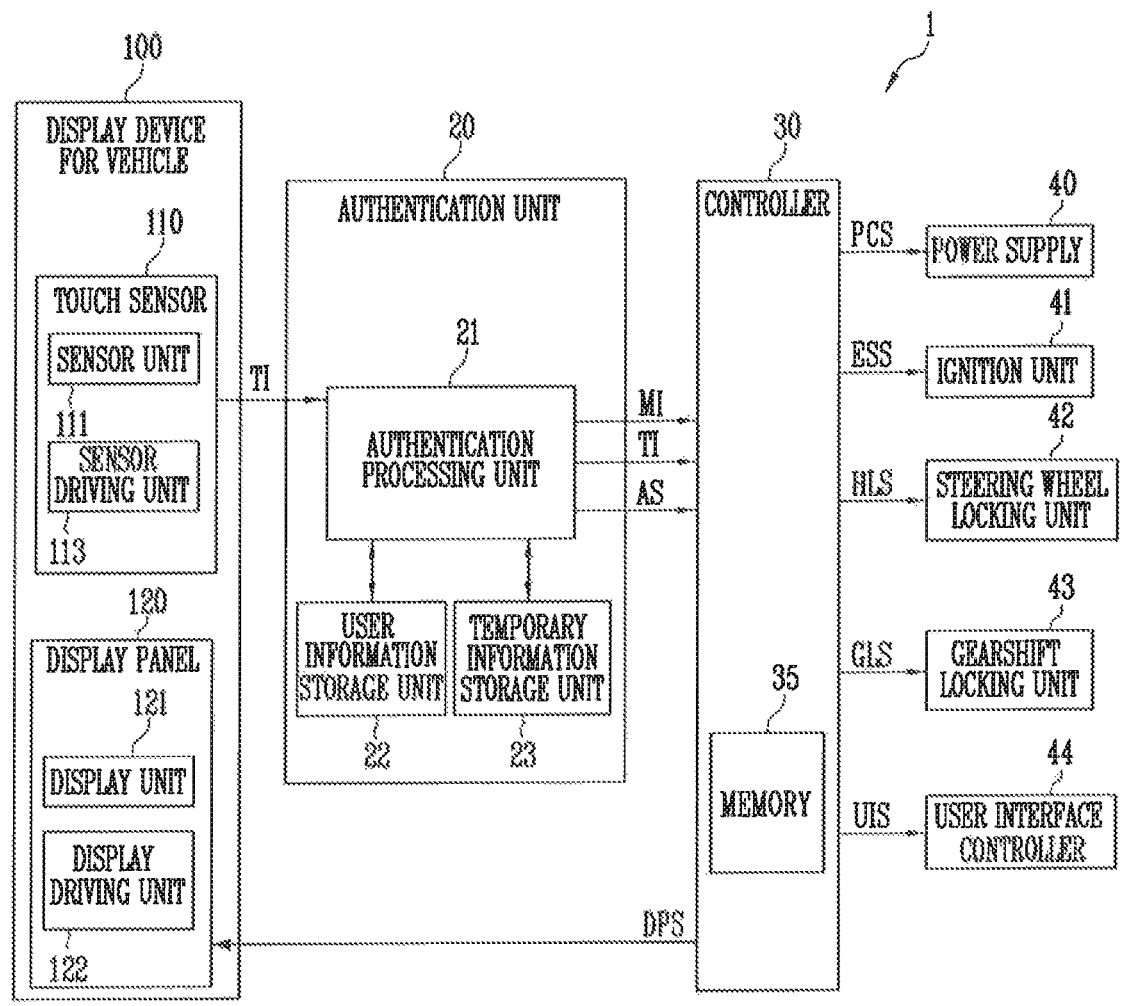
FIG. 10 is a diagram illustrating a vehicle control system in accordance with an exemplary embodiment of the inventive concept.

In an exemplary embodiment of the inventive concept, the display panel 120 may display an image under the control of a controller 30 (refer to FIG. 10).

In an exemplary embodiment of the inventive concept, the display panel 120 may display an image along the perimeter of a portion of the display device 100 which is brought into contact with the user. Furthermore, the display panel 120 may display an image corresponding to operating conditions of the vehicle.

In an exemplary embodiment of the inventive concept, the display panel 120 may display an image in an always-on-display manner. In other words, at least a portion of the display panel 120 may always display an image while a remaining portion of the display panel 120 is turned off, as long as there is sufficient power supplied to the display panel 120 (e.g., from the vehicle).

In FIG. 2B, a display device 100b for a vehicle in accordance with an exemplary embodiment of the inventive concept may further include a pressure sensor 130 and a haptic module 140 as components thereof, compared to the configuration of the display device 100a of FIG. 2A. Therefore, in the description of FIG. 2B, the same reference numerals are used to designate the same components as those of the exemplary embodiment of FIG. 2A, and detailed descriptions pertaining thereto will be omitted if deemed redundant.

Referring to FIG. 2B, the display device 100b may include the touch sensor 110, the display panel 120, the pressure sensor 130, and the haptic module 140.

In FIG. 2B, the touch sensor 110, the display panel 120, the pressure sensor 130, and the haptic module 140 are successively stacked, but the inventive concept is not limited thereto. For example, the sequence in which the touch sensor 110, the display panel 120, the pressure sensor 130, and the haptic module 140 are stacked may be modified in various ways.

The pressure sensor 130 may sense variation in the pressure of the touch generated by the user. For example, the variation in the pressure may be caused by a finger, a palm, or the like which is a part of the user's body. A target to be sensed by the pressure sensor 130 may include variation in the pressure of the touch generated by the user.

The pressure sensor 130 may generate pressure information about variation in the pressure of the touch generated by the user. In an exemplary embodiment of the inventive concept, the pressure information may be additionally included in the above-mentioned touch information.

The haptic module 140 may generate various haptic effects that the user can feel. A vibration effect is a representative example of the haptic effects that are generated by the haptic module 140.

The haptic module 140 may vibrate in at least one of a plurality of vibration patterns. The haptic module 140 may provide vibration having at least one of the plurality of vibration patterns to the user.

In an exemplary embodiment of the inventive concept, the magnitude, pattern, etc. of vibration generated by the haptic module 140 may be controlled by the controller 30 (refer to FIG. 10). For example, the haptic module 140 may combine different vibration patterns and output them, or may successively output the different vibration patterns.

In an exemplary embodiment of the inventive concept, the haptic module 140 may provide vibration to a portion of the display device 100b that is brought into contact with the user.

The haptic module 140 may generate not only vibration but also various haptic effects, e.g., an effect of stimulation caused by pins arranged to make vertical contact with the surface of the skin of the user, discharge or suction force of air through discharge or suction holes, an element brushing by the surface of the skin of the user, an electrode making contact with the skin of the user, electrostatic force, or a cold/hot sensation effect using an element having a heat-absorbing or -generating function.

Not only can the haptic module 140 provide a haptic effect to the user by making direct contact with the user, but it can also be embodied such that the user may feel haptic effects through the muscular sense of the fingers, arms, etc. of the user.

Figure 3:
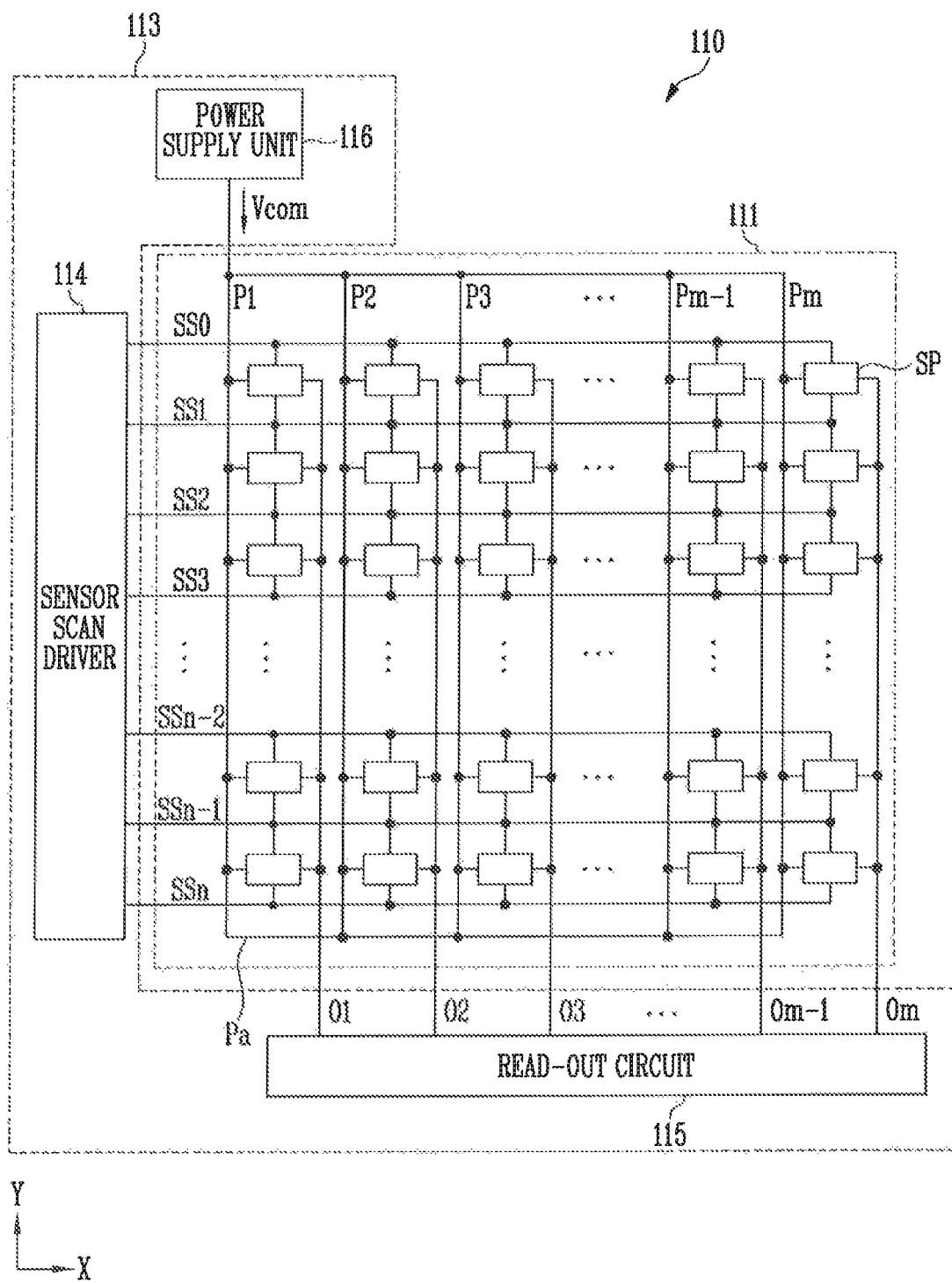
FIG. 3 is a diagram illustrating a touch sensor of FIGS. 2A and 2B in accordance with an exemplary embodiment of the inventive concept.
Figure 4:
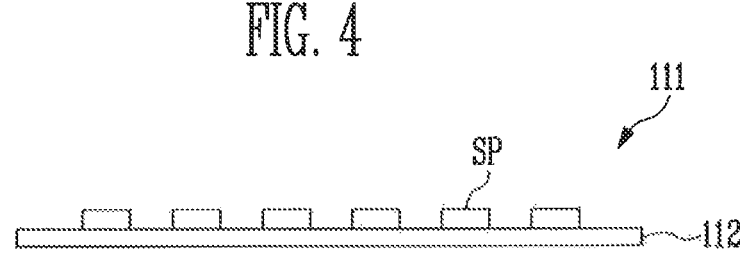
FIG. 4 is a partial sectional view of the touch sensor of FIG. 3 in accordance with an exemplary embodiment of the inventive concept.

FIG. 3 is a diagram illustrating a touch sensor of FIGS. 2A and 2B in accordance with an exemplary embodiment of the inventive concept. FIG. 4 is a partial sectional view of the touch sensor of FIG. 3 according to an exemplary embodiment of the inventive concept.

As described above, the touch sensor 110 in accordance with an exemplary embodiment of the inventive concept may recognize a touch generated by the user.

Referring to FIGS. 3 and 4, the touch sensor 110 in accordance with the present exemplary embodiment may include a sensor unit 111.

The sensor unit 111 may include a substrate 112, and a plurality of sensor pixels SP.

The substrate 112 may be made of insulating material such as glass or resin. Furthermore, the substrate 112 may be made of material having flexibility so as to be bendable or foldable, and have a single layer or multilayer structure.

For example, the substrate 112 may include at least one of the following: polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, or cellulose acetate propionate.

However, the material constituting the substrate 112 may be changed in various ways, and the substrate 112 may also be made of fiber-reinforced plastic (FRP) or the like.

The sensor pixels SP may be disposed on the substrate 112. The sensor pixels SP may be coupled to sensor scan lines SS0 to SSn and output lines O1 to Om.

The sensor pixels SP may receive a sensor scan signal through the sensor scan lines SS0 to SSn. The sensor pixels SP may output a predetermined current, corresponding to a touch state, to associated output lines O1 to Om during a supply period for the sensor scan signal.

The sensor scan lines SS0 to SSn may be disposed on the substrate 112, and extend predetermined lengths in a first direction (e.g., an X-axis direction), and may be coupled to the sensor pixels SP on a line-by-line basis.

The output lines O1 to Om may be disposed on the substrate 112, and may extend in a second direction (e.g., a Y-axis direction) and be coupled to the sensor pixels SP on a line-by-line basis.

The sensor pixels SP may also be coupled to reference voltage lines P1 to Pm, and may be supplied with a reference voltage Vcom through the reference voltage lines P1 to Pm.

The reference voltage lines P1 to Pm may extend predetermined lengths in the second direction (e.g., the Y-axis direction), and may be coupled to the sensor pixels SP on a line-by-line basis.

For example, the reference voltage lines P1 to Pm may be arranged in parallel to the output lines O1 to Om.

However, the arrangement direction of the reference voltage lines P1 to Pm may be variously changed, and the reference voltage lines P1 to Pm may be arranged in parallel to, for example, the sensor scan lines SS0 to SSn.

The reference voltage lines P1 to Pm may be electrically coupled to one another to maintain the same potential.

For example, the reference voltage lines P1 to Pm may be electrically coupled to one another in the perimeter of the substrate 112 via separate wiring Pa.

In an exemplary embodiment of the inventive concept, the touch sensor 110 may further include a sensor driving unit 113. The sensor driving unit 113 may include a sensor scan driver 114 for driving the touch sensor 110, a read-out circuit 115, and a power supply unit 116.

In an exemplary embodiment of the inventive concept, the sensor driving unit 113 may operates the touch sensor 110 in the first mode or the second mode. As described above, the first mode may be a mode in which the touch sensor 110 operates at the first resolution, and the second mode is a mode in which the touch sensor 110 operates at the second resolution lower than the first resolution.

The sensor scan driver 114 may supply sensor scan signals to the sensor pixels SP through the sensor scan lines SS0 to SSn.

For example, the sensor scan driver 114 may sequentially output the sensor scan signals to the sensor scan lines SS0 to SSn.

For example, if the touch sensor 110 operates in the first mode, the sensor scan driver 114 may output sensor scan signals to all of the sensor scan lines SS0 to SSn. If the touch sensor 110 operates in the second mode, the sensor scan driver 114 may output sensor scan signals to some of the sensor scan lines SS0 to SSn. However, the inventive concept is not limited thereto.

The sensor scan signals may have voltage levels sufficient to turn on transistors supplied with the sensor scan signals.

For connection with the sensor scan lines SSo to SSn, the sensor scan driver 114 may be directly mounted on the substrate 112 or may be coupled to the substrate 112 through a separate component such as a flexible printed circuit board (FPCB).

The read-out circuit 115 may receive signals (e.g., currents), output from the sensor pixels SP, through the output lines O1 to Om.

For example, when the sensor scan driver 114 sequentially supplies the sensor scan signals, the sensor pixels SP may be selected on a line-by-line basis, and the read-out circuit 115 may sequentially receive currents output from the sensor pixels SP selected on a line-by-line basis.

Here, the read-out circuit 120 may recognize current touch information by sensing a change in current.

The touch information may include at least one of first information about the fingerprint of the user, second information about the position of the touch, and third information about the movement of the touch. The touch information may further include fourth information about the lines of the knuckles of the finger or the lines of the palm of the user.

For connection with the output lines O1 to Om, the read-out circuit 115 may be directly mounted on the substrate 112, or may be coupled with the substrate 112 by a separate component such as a flexible printed circuit board.

The power supply unit 116 may supply the reference voltage Vcom to the sensor pixels SP through the reference voltage lines P1 to Pm.

For connection with the reference voltage lines P1 to Pm, the power supply unit 116 may be directly mounted on the substrate 112, or may be coupled with the substrate 112 by a separate component such as a flexible printed circuit board.

In FIG. 3, the sensor scan driver 114, the read-out circuit 115, and the power supply unit 116 are separately provided, but at least some of the foregoing components may be integrated with one another if needed.

The sensor scan driver 114, the read-out circuit 115, and the power supply unit 116 may be installed using various methods, such as chip on glass, chip on plastic, tape carrier package, or chip on film methods.

Figure 5:
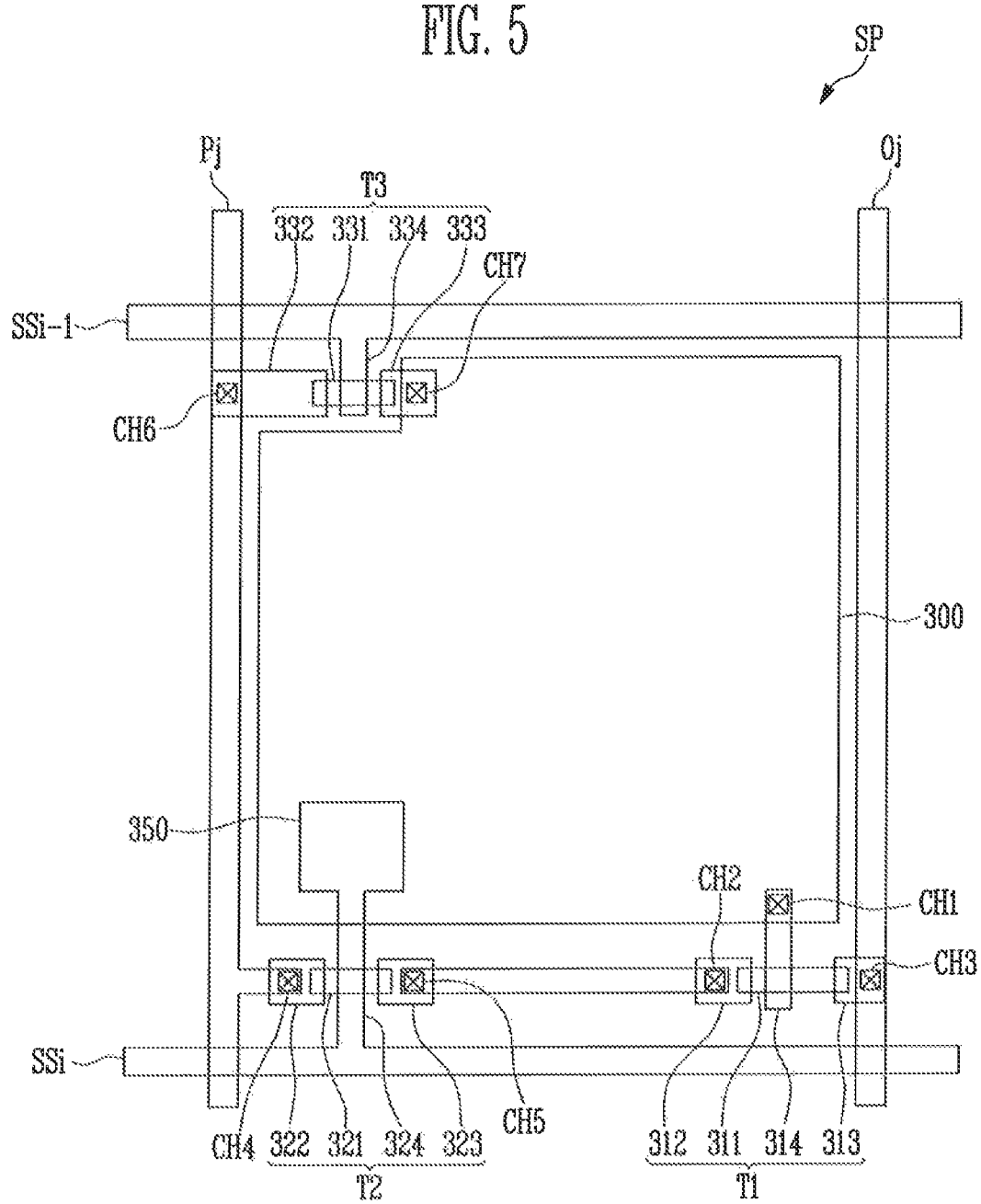
FIG. 5 is a plan view illustrating a sensor pixel of FIG. 3 in accordance with an exemplary embodiment of the inventive concept.

FIG. 5 is a plan view illustrating a sensor pixel of FIG. 3 in accordance with an exemplary embodiment of the inventive concept. Particularly, in FIG. 5, for the sake of description, a pixel coupled to an i-th sensor scan line SSi, an i-1-th sensor scan line SSi-1, a j-th output line Oj, and a j-th reference voltage line Pj is illustrated (where i is an integer of 2 or more and j is a natural number).

Referring to FIG. 5, the sensor pixel SP according to an exemplary embodiment of the inventive concept may include a sensor electrode 300, a first transistor T1, a second transistor T2, a third transistor T3, and a capacitor electrode 350.

The first transistor T1 may control a current flowing to the j-th output line Oj. For this operation, the first transistor T1 may be coupled between the j-th output line Oj and the second transistor T2.

For example, the first transistor T1 may include a first electrode 312 coupled to a second electrode 323 of the second transistor T2, a second electrode 313 coupled to the j-th output line Oj, a gate electrode 314 coupled to the sensor electrode 300, and a semiconductor layer 311 coupled between the first electrode 312 and the second electrode 313.

The gate electrode 314, the first electrode 312, and the second electrode 313 of the first transistor T1 may be coupled to other components through contact holes CH1, CH2, and CH3, respectively.

Therefore, the first transistor T1 may control a current Io which is output to the j-th output line Oj in response to the potential of the sensor electrode 300.

The second transistor T2 may be coupled between the j-th reference voltage line Pj and the first transistor T1.

For example, the second transistor 12 may include a first electrode 322 coupled to the j-th reference voltage line Pj, a second electrode 323 coupled to the first electrode 312 of the first transistor T1, a gate electrode 324 coupled to the i-th sensor scan line SSi, and a semiconductor layer 321 coupled between the first electrode 322 and the second electrode 323.

The first electrode 322 and the second electrode 323 of the second transistor T2 may be coupled to other components through contact holes CH4 and CH5, respectively.

Therefore, the second transistor T2 may be turned on when a sensor scan signal is supplied to the i-th sensor scan line SSi. When the second transistor T2 is turned on, the reference voltage Vcom may be applied to the first electrode 312 of the first transistor T1.

The third transistor T3 may be coupled between the j-th reference voltage line Pj and the sensor electrode 300.

For example, the third transistor T3 may include a first electrode 332 coupled to the j-th reference voltage line Pj, a second electrode 333 coupled to the sensor electrode 300, a gate electrode 334 coupled to the i-1-th sensor scan line SSi-1, and a semiconductor layer 331 coupled between the first electrode 332 and the second electrode 333.

The first electrode 332 and the second electrode 333 of the third transistor T3 may be coupled to other components through contact holes CH6 and CH7, respectively.

Therefore, the third transistor T3 may be turned on when a sensor scan signal is supplied to the i–1-th sensor scan line SSi-1. When the third transistor T3 is turned on, the voltage of the sensor electrode 300 may be initialized to the reference voltage Vcom.

The capacitor electrode 350 may be disposed to overlap the sensor electrode 300, and may thus form a capacitor with the sensor electrode 300.

The capacitor electrode 350 may be coupled to the i-th sensor scan line SSi. For example, the capacitor electrode 350 may be coupled to the i-th sensor scan line SSi through the gate electrode 324 of the second transistor T2.

Here, the capacitor electrode 350 and the gate electrode 324 of the second transistor T2 may be made of substantially the same material as that of the i-th sensor scan line SSi.

The sensor electrode 300 may form a capacitor with the capacitor electrode 350 and a finger or the like of the user.

The sensor electrode 300 may include conductive material. For example, the conductive material may include a metal material, an alloy of metal materials, a conductive polymer, or a transparent conductive material.

Examples of the metal material may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, or lead.

Furthermore, examples of the conductive polymer may include polythiophene, polypyrrole, polyaniline, polyacetylene and polyphenylene compounds, or mixtures thereof. In particular, a poly-3,4-ethylenedioxythiophene/polystyrenesulfonate (PEDOT/PSS) compound of the polythiophene conductive polymer may be used.

Examples of the transparent conductive material may include silver nanowires (AgNW), indium tin oxide (ITO), indium zinc oxide (IZO), antimony zinc oxide (AZO), indium tin zinc oxide (ITZO), zinc oxide (ZnO), tin oxide (SnO2), a carbon nanotube, or grapheme.

Figure 6A:
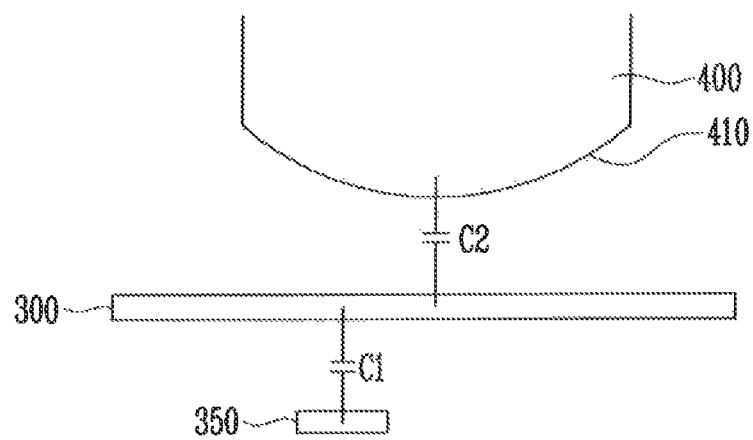
FIGS. 6A and 6B are diagrams illustrating a change in capacitance of a second capacitor related to a sensor electrode of FIG. 5 depending on a ridge and a valley of a fingerprint in accordance with an exemplary embodiment of the inventive concept.
Figure 6B:
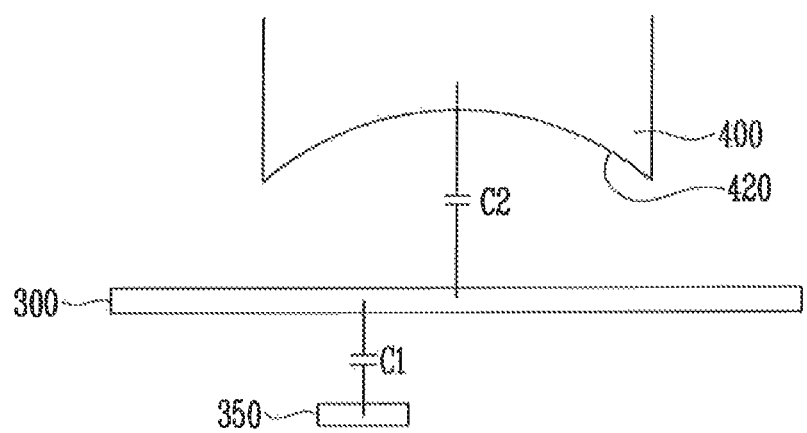

FIGS. 6A and 6B are diagrams illustrating a change in capacitance of a second capacitor related to a sensor electrode of FIG. 5 depending on a ridge and a valley of a fingerprint according to exemplary embodiments of the inventive concept. In particular, FIG. 6A illustrates a ridge 410 of a finger 400 disposed on a sensor pixel SP, and FIG. 6B illustrates a valley 420 of the finger 400 disposed on the sensor pixel SP.

Referring to FIGS. 6A and 6B, the sensor electrode 300 and the capacitor electrode 350 may form a first capacitor C1. The sensor electrode 300 and the capacitor electrode 350 may be spaced apart from each other, and at least one insulating layer may be interposed therebetween.

When the finger 400 of the user is placed on the sensor pixel SP to recognize a fingerprint, the sensor electrode 300 and the finger 400 may form a second capacitor C2.

Here, the second capacitor C2 is a variable capacitor, the capacitance of which may vary depending on whether the ridge 410 or valley 420 of the finger 400 is placed on the sensor electrode 300.

Since the distance between the ridge 410 and the sensor electrode 300 is shorter than the distance between the valley 420 and the sensor electrode 300, the capacitance of the second capacitor C2 in FIG. 6A and the capacitance of the second capacitor C2 in FIG. 6B may differ from each other.

Referring to FIGS. 3 to 6A and 6B, since a change in the capacitance of the second capacitor C2 influences the output current Io of the sensor pixel SP, the read-out circuit 115 may recognize the fingerprint of the user by sensing a change in the output current Io.

A sensor protective layer may be disposed on the sensor electrode 300. The sensor protective layer may be used as a surface to receive the touch of the user.

The read-out circuit 115 may also recognize the lines of the knuckles of the finger or the lines of the palm of the user in the foregoing manner.

Figure 7:
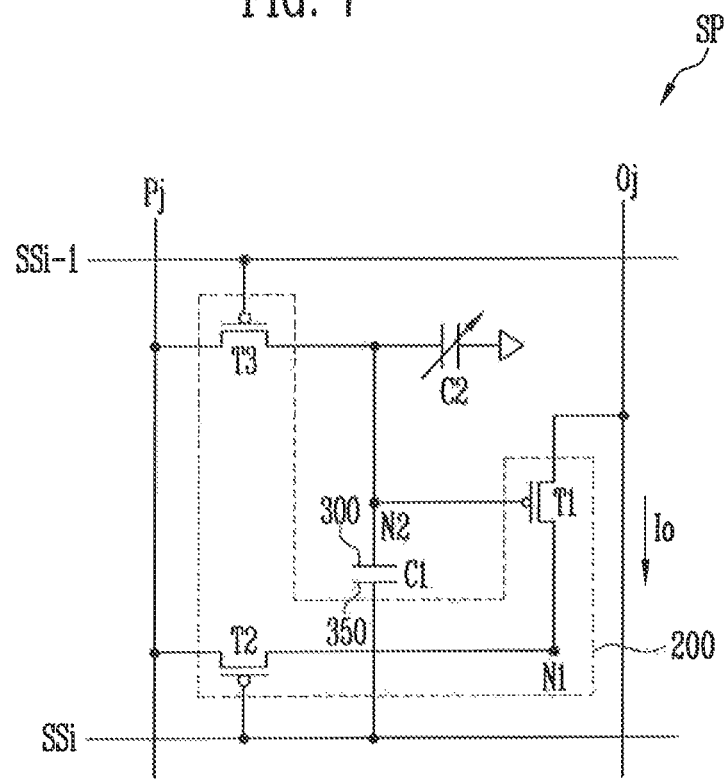
FIG. 7 is a diagram illustrating an equivalent circuit diagram of the sensor pixel of FIG. 5 in accordance with an exemplary embodiment of the inventive concept.
Figure 8:
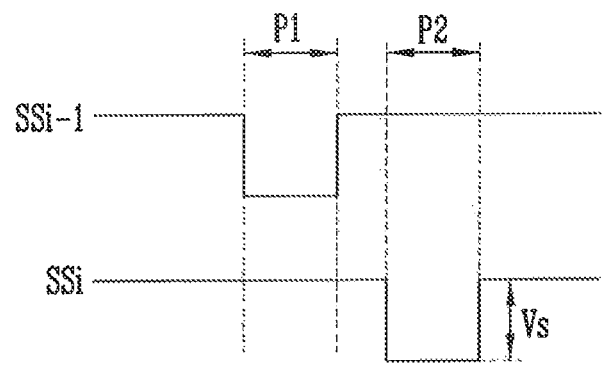
FIG. 8 is a waveform diagram illustrating the operation of the sensor pixel of FIG. 7 in accordance with an exemplary embodiment of the inventive concept.

FIG. 7 is a diagram illustrating an equivalent circuit diagram of the sensor pixel of FIG. 5 in accordance with an exemplary embodiment of the inventive concept. FIG. 8 is a waveform diagram illustrating the operation of the sensor pixel of FIG. 7 in accordance with an exemplary embodiment of the inventive concept.

In particular, for the sake of the description, the sensor pixel SP coupled to the i-th sensor scan line SSi, the i–1-th sensor scan line SSi-1, the j-th reference voltage line Pj, and the j-th output line Oj is illustrated in FIG. 7. In FIG. 8, a sensor scan signal that is supplied to the i–1-th sensor scan line SSi-1 and a sensor scan signal that is supplied to the i-th sensor scan line SSi are illustrated.

Referring to FIG. 7, the sensor pixel SP may include the sensor electrode 300, the capacitor electrode 350, the first transistor T1, the second transistor T12, and the third transistor T3.

As described above, the sensor electrode 300 and the capacitor electrode 350 may constitute the first capacitor C1. The first transistor T1, the second transistor T2, and the third transistor T3 may form a sensor circuit 200.

The second capacitor C2, which is a variable capacitor, may be formed by the sensor electrode 300 and the finger 400, as described above. Here, the capacitance of the second capacitor C2 may change depending on the distance between the sensor electrode 300 and the finger 400, information about whether a valley or ridge of the finger 400 is placed on the sensor electrode 300, the magnitude of pressure applied by a touch, or the like.

The first transistor T1 may control a current flowing to the j-th output line Oj. In the present exemplary embodiment, the first transistor T1 may be coupled between the j-th output line Oj and the second transistor T2.

In other words, the first transistor T1 may be coupled between the j-th output line Oj and a first node N1, and the gate electrode thereof may be coupled to a second node N2.

For example, the first transistor T1 may include a first electrode coupled to a second electrode of the second transistor T2 via the first node N1, a second electrode coupled to the j-th output line Oj, and a gate electrode coupled to the sensor electrode 300 via the second node N2.

The second transistor T2 may be coupled between the j-th reference voltage line Pj and the first transistor T1.

In other words, the second transistor T2 may be coupled between the j-th reference voltage line Pj and the first node N1, and the gate electrode thereof may be coupled to the i-th sensor scan line SSi.

For example, the second transistor T2 may include a first electrode coupled to the j-th reference voltage line Pj, a second electrode coupled to the first electrode of the first transistor T1 via the first node N1, and a gate electrode coupled to the i-th sensor scan line SSi.

Therefore, the second transistor T2 may be turned on when a sensor scan signal is supplied to the i-th sensor scan line SSi. When the second transistor T2 is turned on, the reference voltage Vcom may be applied to the first electrode of the first transistor T1.

The third transistor T3 may be coupled between the j-th reference voltage line Pj and the sensor electrode 300.

In other words, the third transistor T3 may be coupled between the second node N2 and the j-th reference voltage line Pj, and the gate electrode thereof may be coupled to the i−1-th sensor scan line SSi-1.

For example, the third transistor T3 may include a first electrode coupled to the j-th reference voltage line Pj, a second electrode coupled to the sensor electrode 300 via the second node N2, and a gate electrode coupled to the i−1-th sensor scan line SSi-J.

Therefore, the third transistor T3 may be turned on when a sensor scan signal is supplied to the i−1-th sensor scan line SSi-1. When the third transistor T3 is turned on, the voltage of the sensor electrode 300 may be initialized to the reference voltage Vcom.

The capacitor electrode 350 may be disposed to overlap the sensor electrode 300, and may then form the first capacitor C1 with the sensor electrode 300.

The capacitor electrode 350 may be coupled to the i-th sensor scan line SSi.

Thus, the first capacitor C1 may be coupled between the second node N2 and the i-th sensor scan line SSi.

The second capacitor C2 may be coupled to the second node N2.

The first node N1 is a node to which the first electrode of the first transistor T1 and the second electrode of the second transistor T2 are coupled in common, and the second node N2 is a node to which the sensor electrode 300, the gate electrode of the first transistor T1, and the second electrode of the third transistor T3 are coupled in common.

Here, the first electrode of each of the transistors T1, T2, and T3 may be set to any one of a source electrode and a drain electrode, and the second electrode of each of the transistors T1, T2, and T3 may be set to an electrode different from the first electrode thereof. For example, if the first electrode is set to a source electrode, the second electrode may be set to a drain electrode.

In FIG. 7, the transistors T1, T2, and T3 are PMOS transistors, but the transistors T1, T2, and T3 may also be embodied by NMOS transistors.

FIG. 8 is a waveform diagram illustrating the operation of the sensor pixel of FIG. 7. Referring to FIG. 8, during a first period P1, a sensor scan signal may be supplied to the i−1-th sensor scan line SSi-1.

Therefore, during the first period P1, the third transistor 13 may remain turned on, and the second node N2 may be initialized to the reference voltage Vcom which is applied from the j-th reference voltage line Pj.

Thereafter, during a second period P2, the sensor scan signal may be supplied to the i-th sensor scan line SSi.

Therefore, during the second period P2, the second transistor T2 may remain turned on, and the current Io (or output current Io) may flow from the j-th reference voltage line Pj to the j-th output line Oj through the second transistor T2 and the first transistor T1.

Here, the first transistor T1 may control the amount of output current Io in response to a gate voltage (e.g., the voltage applied to the second node N2).

For example, the output current Io may change depending on a gate voltage Vg of the first transistor T1, and the gate voltage Vg of the first transistor T1 may be determined by the following equation:

$$Vg = Vcom + \{Vc1/(Vc1+Vc2)\} * Vs$$

Vcom denotes the reference voltage, Vc1 denotes the capacitance of the first capacitor C1, Vc2 denotes the capacitance of the second capacitor C2, and Vs denotes a change in the voltage of the sensor scan signal that is supplied to the i-th sensor scan line SSi.

Figure 9:
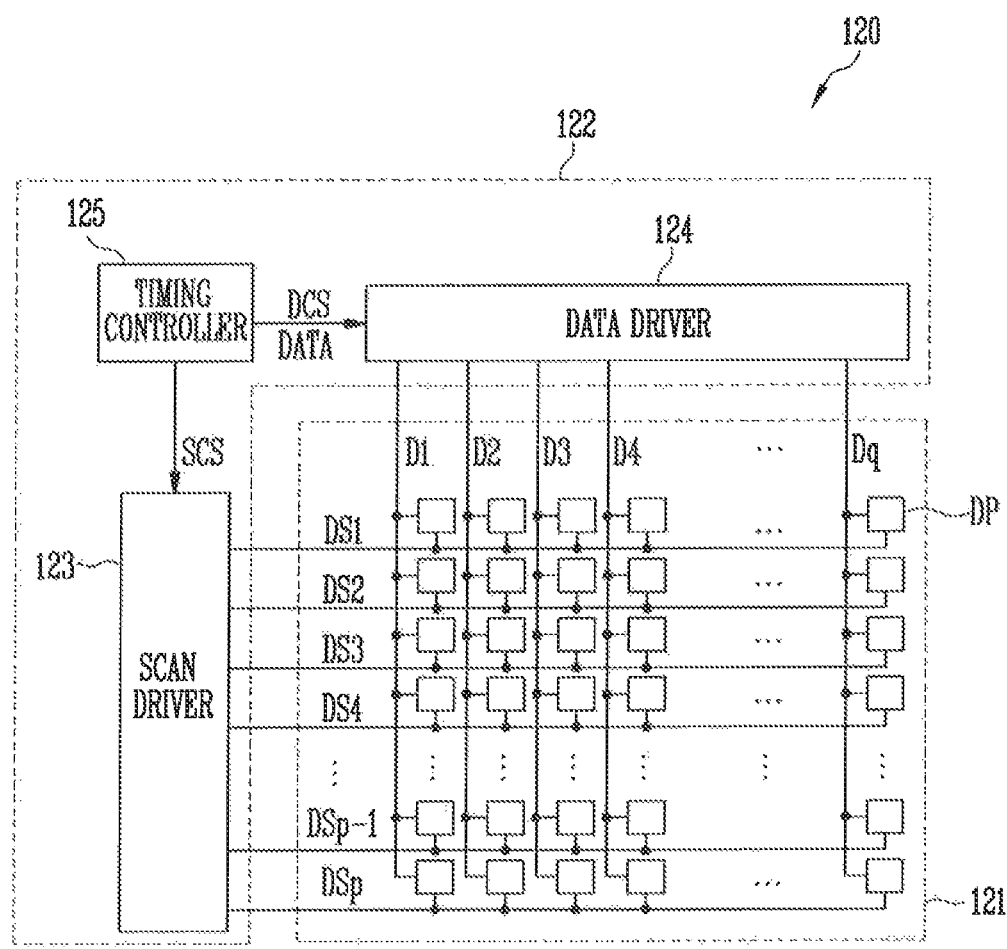
FIG. 9 is a diagram illustrating a display panel of FIGS. 2A and 2B in accordance with an exemplary embodiment of the inventive concept.

FIG. 9 is a diagram illustrating a display panel of FIGS. 2A and 2B in accordance with an exemplary embodiment of the inventive concept.

Referring to FIG. 9, the display panel 120 in accordance with an exemplary embodiment of the inventive concept may include a display pixel unit 121.

The display pixel unit 121 may include a plurality of display pixels DP.

The display pixels DP may be coupled to data lines D1 to Dq and display scan lines DS1 to DSp. For example, the display pixels DP may be arranged in the form of a matrix at intersections of the data lines D1 to Dq and the display scan lines DS1 to DSp.

The display pixels DP may be supplied with data signals and display scan signals through the data lines D1 to Dq and the display scan lines DS1 to DSp, respectively.

Each display pixel DP may include a light-emitting element (e.g., an organic light-emitting diode), and may generate light corresponding to a data signal using current flowing from a first power supply ELVDD into a second power supply ELVSS via the light-emitting element.

The display panel 120 in accordance with an exemplary embodiment of the inventive concept may further include a display driving unit 122 for driving the display pixel unit 121.

The display driving unit 122 may include a scan driver 123, a data driver 124, and a timing controller 125.

The scan driver 123 may provide the display scan signals to the display scan lines DS1 to DSp in response to a scan driver control signal SCS. For example, the scan driver 123 may sequentially supply the display scan signals to the display scan lines DS1 to DSp.

To connect to the display scan lines DS1 to DSp, the scan driver 123 may be directly mounted on a display substrate or may be coupled to the display substrate through a separate component such as a flexible printed circuit board.

The data driver 124 may receive a data driver control signal DCS and image data DATA from the timing controller 125 and may generate the data signals in response to the data driver control signal DCS and the image data DATA.

The data driver 124 may supply the generated data signals to the data lines D1 to Dq.

To connect to the data lines D1 to Dq, the data driver 124 may be directly mounted on the display substrate or may be coupled to the display substrate through a separate component such as a flexible printed circuit board.

In an exemplary embodiment of the inventive concept, the display substrate may be substantially the same as the substrate 112 of FIG. 4.

When a display scan signal is provided through a certain display scan line, some of the display pixels DP coupled to the certain display scan line may be supplied with data signals transmitted from the data lines D1 to Dq and may emit light at luminance levels corresponding to the supplied data signals.

The timing controller 125 may generate control signals for controlling the scan driver 123 and the data driver 124.

For example, the control signals may include the scan driver control signal SCS for controlling the scan driver 123, and the data driver control signal DCS for controlling the data driver 124.

The timing controller 125 may provide the scan driver control signal SCS to the scan driver 123 and provide the data driver control signal DCS to the data driver 124.

The timing controller 125 may convert the image data DATA in conformity with the specification of the data driver 124 and may provide the converted data to the data driver 124.

In FIG. 9, the scan driver 123, the data driver 124, and the timing controller 125 are separately provided, but at least some of the foregoing components may be integrated with one another if needed.

In an exemplary embodiment of the inventive concept, the display driving unit 122 may be integrated with the sensor driving unit 113 shown in FIG. 3.

The scan driver 123, the data driver 124, and the timing controller 125 may be installed using various methods, such as chip on glass, chip on plastic, tape carrier package, or chip on film methods.

FIG. 10 is a diagram illustrating a vehicle control system in accordance with an exemplary embodiment of the inventive concept. Referring to FIG. 10, a vehicle control system 1 may include the display device 100 for a vehicle, an authentication unit 20, and the controller 30.

The display device 100 may include the touch sensor 110 and the display panel 120.

Although the pressure sensor 130 and the haptic module 140 shown in FIG. 2B are not illustrated in FIG. 10, the inventive concept is not limited thereto.

The touch sensor 110 may sense a touch of the user and generate touch information TI about the touch. The touch sensor 110 may transmit the generated touch information TI to the authentication unit 20.

The touch sensor 110 may include the sensor unit 111 and the sensor driving unit 113.

The sensor unit 111 may include the plurality of sensor pixels SP (refer to FIG. 3).

As described above, in an exemplary embodiment of the inventive concept, the sensor driving unit 113 may operate the touch sensor 110 in the first mode or the second mode. As described above, the first mode may be a mode in which the touch sensor 110 operates at the first resolution, and the second mode is a mode in which the touch sensor 110 operates at the second resolution lower than the first resolution.

The display panel 120 may display an image in response to a display panel control signal DPS received from the controller 30. For example, the display panel control signal DPS may include image data related to at least one of a plurality of images.

The display panel 120 may include the display pixel unit 121 and the display driving unit 122.

The display pixel unit 121 may include the plurality of display pixels DP (refer to FIG. 9).

The authentication unit 20 may authenticate the user of the vehicle based on the touch information TI.

The authentication unit 20 may include an authentication processing unit 21, a user information storage unit 22, and a temporary information storage unit 23.

The authentication processing unit 21 may receive the touch information TI and store it in the temporary information storage unit 23.

The authentication processing unit 21 may compare the touch information TI with a plurality of pieces of registration information stored in the user information storage unit 22. For example, the authentication processing unit 21 may check whether the touch information TI matches any one of the plurality of pieces of registration information.

When the touch information TI matches one of the plurality of pieces of registration information, the authentication processing unit 21 may transmit the touch information TI, matched registration information MI, and an approval signal AS to the controller 30. In other words, if the user is a registered user, the authentication processing unit 21 may authenticate the user and transmit the touch information TI, the matched registration information MI, and the approval signal AS to the controller 30.

Each piece of registration information may include the touch information TI of a corresponding user.

In an exemplary embodiment of the inventive concept, each piece of registration information may further include user interface information of a corresponding user. For example, the user interface information may include information about at least one of a position of a steering wheel, orientation of a rear-view mirror or a side mirror, a position and an angle of a driver seat, an audio channel, or an air conditioning temperature.

The user information storage unit 22 may store the plurality of pieces of registration information and provide the registration information to the authentication processing unit 21 under the control of the authentication processing unit 21.

The temporary information storage unit 23 may store the touch information TI and provide the touch information TI to the authentication processing unit 21 under the control of the authentication processing unit 21.

In an exemplary embodiment of the inventive concept, the user information storage unit 22 and the temporary information storage unit 23 may be integrated with each other into one unit and disposed in the authentication processing unit 21.

The controller 30 may receive the touch information TI, the matched registration information MI, and the approval signal AS from the authentication unit 20.

The controller 30 may control the general operation of the vehicle based on the touch information TI, the matched registration information MI, and the approval signal AS.

For example, the controller 30 may control the power or ignition of the vehicle.

In detail, when the approval signal AS is received, the controller 30 may detect third information included in the touch information TI.

When the third information is matched with a first direction, the controller 30 may control the vehicle such that the power of the vehicle is turned on. Here, the controller 30 may transmit a power control signal PCS to a power supply 40 so that the power of the vehicle may be turned on.

When the third information is matched with a second direction, the controller 30 may control the vehicle such that the ignition and power of the vehicle are turned on. Here, the controller 30 may transmit the power control signal PCS to the power supply 40 and transmit an ignition control signal ESS to an ignition unit 41 so that the power and the ignition of the vehicle may be turned on.

When the third information is matched with a third direction, the controller controls the vehicle such that the power of the vehicle is turned on and, after a predetermined time has passed to preheat the vehicle, the ignition of the vehicle is turned on. Here, the controller 30 may transmit the power control signal PCS to the power supply 40, and then transmit, after a predetermined time has passed, the ignition control signal ESS to the ignition unit 41 so that the power and the ignition of the vehicle may be sequentially turned on. For example, the predetermined time may be five seconds, but the inventive concept is not limited thereto.

When the third information is matched with a fourth direction, the controller 30 may control the vehicle such that the power and the ignition of the vehicle are turned off. Here, the controller 30 may interrupt the transmission of the power control signal PCS to the power supply 40 and interrupt the transmission of the ignition control signal ESS to the ignition unit 41 so that the power and the ignition of the vehicle are turned off. However, the inventive concept is not limited thereto.

The above-described first to fourth directions will be further described below with reference to FIGS. 13A and 13B.

When the approval signal AS is received, the controller 30 may unlock the steering wheel (e.g., the steering wheel 11 of FIG. 1) by transmitting a steering wheel unlocking signal HLS to a steering wheel locking unit 42. When the approval signal AS is received, the controller 30 may also unlock the gearshift lever by transmitting a gearshift lever unlocking signal GLS to a gearshift lever locking unit 43.

Accordingly, since the controller 30 controls the locking of the steering wheel and the gearshift lever based on the touch information TI of the user, the display device 100 and the vehicle control system 1 including the same, in accordance with an exemplary embodiment of the inventive concept, may have increased security performance.

Additionally, when the approval signal AS is received, the controller may transmit a user interface setting signal UIS to a user interface controller 44 so as to provide a preset user interface to the user.

In other words, according to user interface information preset for different users, the controller 30 may control at least one of the position of the steering wheel, the orientation of the rear-view mirror and the side mirror, the position and angle of the driver seat, the audio channel, or the air conditioning temperature that are preset for a corresponding user.

In an exemplary embodiment of the inventive concept, the user interface information preset for different users may be included in the pieces of registration information, but the inventive concept is not limited thereto. For example, the user interface information may be stored in a memory 35 of the controller 30.

Accordingly, since the controller 30 provides the preset user interface to the user based on the touch information TI of the user, the display device 100 and the vehicle control system 1 including the same, in accordance with an exemplary embodiment of the inventive concept, may provide optimized user interfaces for users.

Furthermore, for example, when the approval signal AS is received, the controller 30 may transmit the display panel control signal DPS to the display panel 120 based on a touch signal and a pressure signal so that the display panel 120 displays at least one of a plurality of images.

The controller 30 may include the memory 35. The memory 35 may include the plurality of images. In an exemplary embodiment of the inventive concept, the memory 35 may store the user interface formation preset for different users. However, the inventive concept is not limited thereto.

FIG. 11 is a flowchart illustrating a method of operating the vehicle control system of FIG. 10 in accordance with an exemplary embodiment of the inventive concept.

Referring to FIGS. 1A to 11, the user may touch the display device 100 for the vehicle with his/her hand, in operation S10.

In an exemplary embodiment of the inventive concept, the touch sensor 110 may generate the touch information TI, in operation S20.

The authentication unit 20 may compare the touch information TI with the plurality of pieces of registration information, in operation S30.

When the touch information TI is matched with any one of the plurality of pieces of registration information (operation S40: YES), the authentication unit 20 may transmit the touch information TI, the matched registration information MI, and an approval signal AS to the controller 30, in operation S50.

The controller 30 may control the vehicle based on the touch information TI, the matched registration information MI, and the approval signal AS, in operation S60.

When the touch information TI is not matched with any of the plurality of pieces of registration information (operation S40: NO), the above-described method may end.

FIG. 12 is a flowchart illustrating in detail an operation in which the touch sensor generates touch information in FIG. 11 in accordance with an exemplary embodiment of the inventive concept.

Operations described with reference to FIG. 12 may be included in operation S20 of FIG. 11.

Referring to FIGS. 1A to 12, the touch sensor 110 may operate in the first mode and generate the first information, in operation S21.

If the touch sensor 110 has completed generation of the first information (operation S22: YES), the touch sensor 110 may operate in the second mode and generate the second information and the third information, in operation S23. Otherwise (operation S22: NO), the touch sensor 110 may continue to perform operation S21.

In an exemplary embodiment of the inventive concept, the touch sensor 110 may further generate the fourth information in the first mode.

Figure 13A:
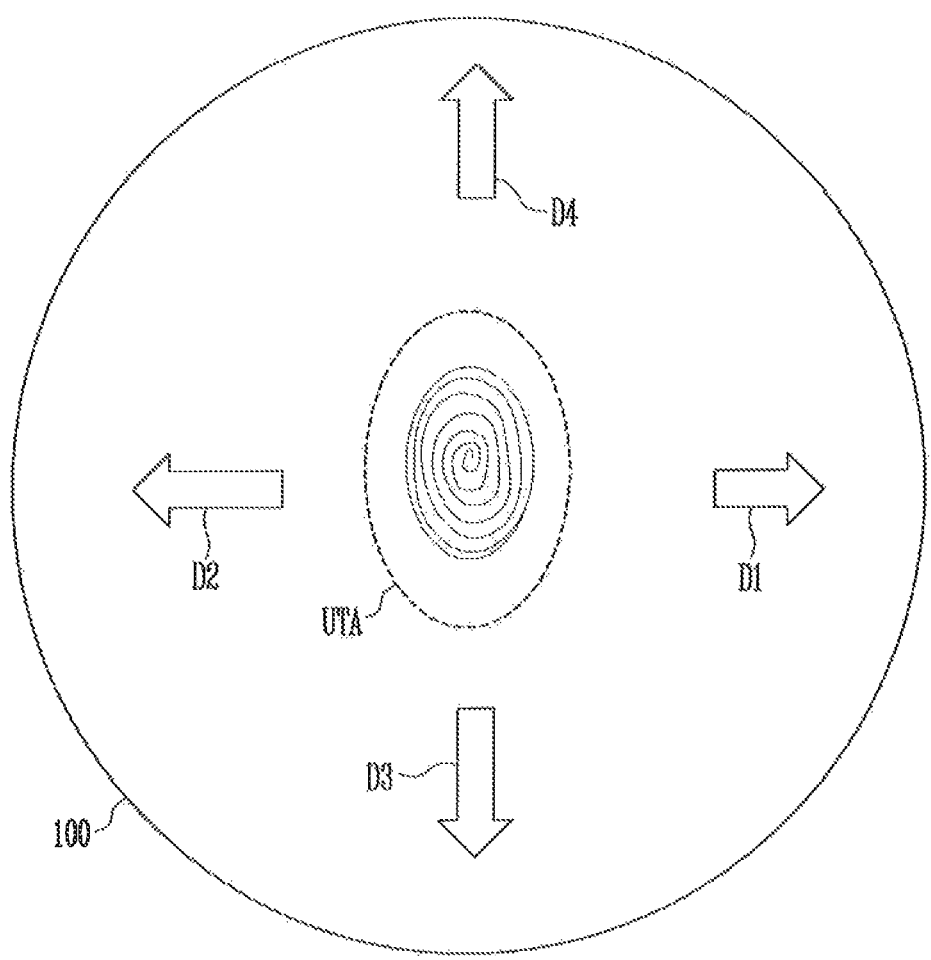
FIGS. 13A and 13B are diagrams illustrating a display device for a vehicle in accordance with exemplary embodiments of the inventive concept.
Figure 13B:
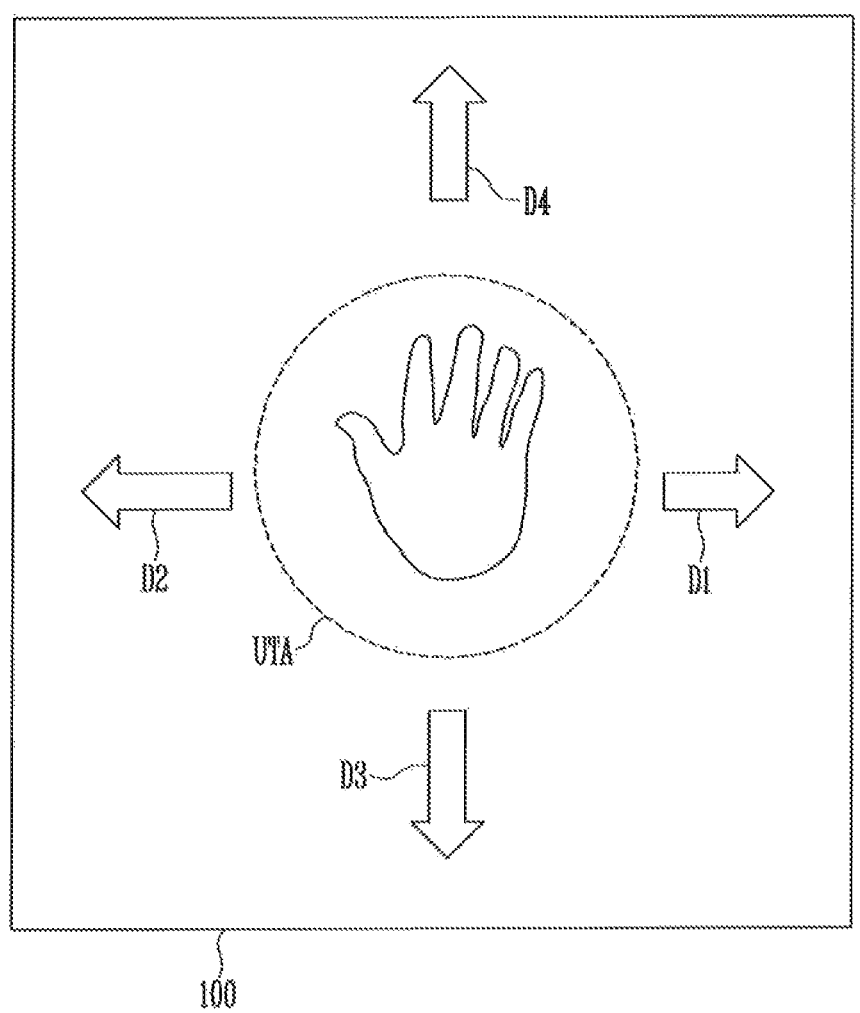

FIGS. 13A and 13B are diagrams illustrating a display device for a vehicle in accordance with exemplary embodiments of the inventive concept. FIG. 14 is a flowchart illustrating in detail an operation in which the controller of FIG. 10 controls the vehicle in accordance with an exemplary embodiment of the inventive concept.

Referring to FIGS. 13A and 13B, the user may bring his/her hand into contact with the display device 100.

In an exemplary embodiment of the inventive concept, as shown in FIG. 13A, the user may bring the fingerprint of his/her finger into contact with the display device 100. In an exemplary embodiment of the inventive concept, as shown in FIG. 13B, the user may bring his/her palm into contact with the display device 100. However, the inventive concept is not limited thereto.

Here, a portion of the display device 100 that makes contact with the hand of the user may be called a user touch area UTA.

The user may move his/her hand so that the user touch area UTA moves in any one of first to fourth directions D1, D2, D3, and D4.

Referring to FIGS. 1 to 13A and 13B, the touch sensor 110 may generate the third information about the movement of the touch of the user. The third information may indicate the direction in which the user touch area UTA has moved.

Referring to FIGS. 10 to 14, the controller 30 may detect the third information included in the touch information TI, in operation S61.

The controller may determine whether the third information is matched with any one of the first to fourth directions D1, D2, D3, and D4, in operation S62. If there is no match (operation S62: NO), the operation may end.

When the third information is matched with the first direction D1, the controller 30 may control the vehicle such that the power of the vehicle is turned on, in operation S63.

When the third information is matched with the second direction D2, the controller 30 may control the vehicle such that the power and the ignition of the vehicle are turned on, in operation S64.

When the third information is matched with the third direction D3, the controller controls the vehicle such that the power of the vehicle is turned on and, after a predetermined time has passed to preheat the vehicle, the ignition of the vehicle is turned on, in operation S65.

When the third information is matched with the fourth direction D4, the controller 30 may control the vehicle such that the power and the ignition of the vehicle are turned off, in operation S66.

As described above, a display device for a vehicle and a vehicle control system including the same in accordance with an exemplary embodiment of the inventive concept may perform an authentication process at the moment that a user touches the display device for the vehicle.

As described above, a display device for a vehicle and a vehicle control system including the same in accordance with an exemplary embodiment of the inventive concept may have increased security performance.

As described above, a display device for a vehicle and a vehicle control system including the same in accordance with an exemplary embodiment of the inventive concept may provide an optimized user interface to different users.

While the inventive concept has been shown and described with reference to exemplary embodiments thereof, it will be understood by those of ordinary skill in the art that various changes in form and details may be made thereto without departing from the spirit and scope of the inventive concept as set forth in the following claims.

What is claimed is:

1. A display device for a vehicle, comprising:
   a display panel configured to display an image; and
   a touch sensor disposed on the display panel and configured to sense a touch of a user and generate touch information about the touch,
   wherein the touch sensor is operated in a first mode or a second mode,
   wherein the first mode is a mode in which the touch sensor operates at a first resolution, and the second mode is a mode in which the touch sensor operates at a second resolution lower than the first resolution,
   wherein the touch information includes first information about a fingerprint of the user, second information about a position of the touch, and third information about movement of the touch,
   wherein when the touch of the user is sensed, the touch sensor operates in the first mode and generates the first information,
   wherein when the generation of the first information is completed, the touch sensor operates in the second mode and generates the second information and the third information,
   wherein power and ignition of the vehicle are controlled using the touch information, and
   wherein the display device is a start button of the vehicle.

2. The display device of claim 1, wherein the display device is disposed in a center fascia of the vehicle.

3. The display device of claim 1, further comprising:
   a pressure sensor configured to generate pressure information about a change in pressure of the touch of the user, and
   wherein the touch information further includes the pressure information.

4. The display device of claim 1, further comprising a haptic module configured to generate a haptic effect to be felt by the user, using the touch information.

5. The display device of claim 1, wherein the display panel displays the image in an always-on-display manner.

6. The display device of claim 1, wherein the touch information further comprises:
   fourth information about lines of knuckles of a finger or lines of a palm of the user.

7. The display device of claim 1, wherein the touch sensor comprises:
   a plurality of sensor pixels configured to sense a change in capacitance corresponding to the touch; and
   sensor scan lines and output lines coupled to the plurality of sensor pixels,
   wherein, among the plurality of sensor pixels, a first sensor pixel is coupled to an i-th sensor scan line and a j-th output line,
   wherein i is an integer greater than or equal to 2 and j is a natural number, and
   wherein the first sensor pixel comprises:
   a sensor electrode;
   a first transistor comprising a gate electrode coupled to the sensor electrode, the first transistor being configured to control current output through the j-th output line;
   a second transistor comprising a gate electrode coupled to the i-th sensor scan line, the second transistor being coupled between a reference voltage line and the first transistor; and
   a capacitor electrode configured to form a first capacitor with the sensor electrode, and coupled to the i-th sensor scan line.

8. The display device of claim 7, wherein the first sensor pixel further comprises:
   a third transistor comprising a gate electrode coupled to an i–1-th scan line, the third transistor being coupled between the reference voltage line and the sensor electrode.

9. The display device of claim 8,
   wherein the sensor electrode forms a second capacitor in response to the touch, and
   wherein the touch sensor generates the touch information using a change in capacitance of the second capacitor corresponding to the touch.

10. A vehicle control system comprising:
    a display device for a vehicle;
    an authentication unit configured to authenticate a user of the vehicle using touch information; and
    a controller configured to control the vehicle using the touch information and a result of authentication by the authentication unit,
    wherein the display device comprises:
    a display panel configured to display an image; and
    a touch sensor disposed on the display panel and configured to sense a touch of the user and generate the touch information about the touch,
    wherein the touch sensor comprises a plurality of sensor pixels configured to sense a change in capacitance corresponding to the touch,
    wherein the touch sensor is operated in a first mode or a second mode,
    wherein the first mode is a mode in which the touch sensor operates at a first resolution, and the second mode is a mode in which the touch sensor operates at a second resolution lower than the first resolution, wherein the touch information includes third information about movement of the touch, and wherein the controller controls at least one of power and ignition of the vehicle according to a direction in which the third information is matched.

11. The vehicle control system of claim 10, wherein the touch information includes first information about a fingerprint of the user, and second information about a position of the touch.

12. The vehicle control system of claim 11, wherein the touch information further comprises:

fourth information about lines of knuckles of a finger or lines of a palm of the user.

13. The vehicle control system of claim 11, wherein when the touch of the user is sensed, the touch sensor operates in the first mode and generates the first information, and wherein when the generation of the first information is completed, the touch sensor operates in the second mode and generates the second information and the third information.

14. The vehicle control system of claim 13, wherein the authentication unit comprises:

an authentication processing unit configured to compare the touch information with a plurality of pieces of registration information, and transmit the touch information, matched registration information, and an approval signal to the controller when the touch information is matched with any one of the plurality of pieces of registration information;

a user information storage unit configured to store the plurality of pieces of registration information; and a temporary information storage unit configured to store the touch information.

15. The vehicle control system of claim 14, wherein, when the approval signal is received, the controller controls the vehicle such that a steering wheel and a gearshift lever thereof are unlocked.

16. The vehicle control system of claim 14, wherein, when the approval signal is received, the controller provides a preset user interface to the user using the matched registration information, and wherein the preset user interface includes at least one of a position of a steering wheel, orientation of a rear-view mirror and a side mirror, a position and an angle of a driver seat, an audio channel, or an air conditioning temperature.

17. The vehicle control system of claim 14, wherein, when the approval signal is received, the controller detects the third information included in the touch information.

18. The vehicle control system of claim 17, wherein, when the third information is matched with a first direction, the controller controls the vehicle such that the power of the vehicle is turned on, wherein, when the third information is matched with a second direction, the controller controls the vehicle such that the power and the ignition of the vehicle are turned on, wherein, when the third information is matched with a third direction, the controller controls the vehicle such that the power of the vehicle is turned on and, after a predetermined time has passed to preheat the vehicle, the ignition of the vehicle is turned on, and wherein, when the third information is matched with a fourth direction, the controller controls the vehicle such that the power and the ignition of the vehicle are turned off.

19. A method of operating a vehicle control system including a display device having a touch sensor, an authentication unit, and a controller, the method comprising:

sensing, by the display device, a touch of a user on the touch sensor;

generating, by the display device, first information about a fingerprint of the user;

determining whether generation of the first information is completed;

generating, by the display device, second information about a position of the touch and third information about movement of the touch when it is determined that generation of the first information is completed, wherein each of the second information and the third information is sensed at a lower resolution than the first information;

transmitting touch information including the first information, the second information, and the third information from the display device to the authentication unit;

authenticating, by the authentication unit, the user using the touch information; and controlling, by the controller, at least one of power or ignition of a vehicle according to a direction in which the third information is matched using the touch information when the user is authenticated.

* * * * *